(12) United States Patent
Rozenbaum

(10) Patent No.: US 12,470,480 B2
(45) Date of Patent: Nov. 11, 2025

(54) HARDWARE-ACCELERATED FLEXIBLE STEERING RULES OVER SERVICE FUNCTION CHAINING (SFC)

(71) Applicant: Mellanox Technologies, Ltd., Yokneam (IL)

(72) Inventor: Chen Rozenbaum, Be'er Ya'akov (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/649,295

(22) Filed: Apr. 29, 2024

(65) Prior Publication Data

US 2025/0337684 A1 Oct. 30, 2025

(51) Int. Cl.
*H04L 45/586* (2022.01)
*H04L 45/00* (2022.01)
*H04L 45/42* (2022.01)

(52) U.S. Cl.
CPC ............ *H04L 45/586* (2013.01); *H04L 45/38* (2013.01); *H04L 45/42* (2013.01)

(58) Field of Classification Search
CPC ... H04L 45/22; H04L 45/745; H04L 12/4641; H04L 12/4633; H04L 45/74; H04L 45/02; H04L 45/64; H04L 45/586; H04L 45/42; H04L 45/38
See application file for complete search history.

(56) References Cited

U.S. PATENT DOCUMENTS

| | | | |
|---|---|---|---|
| 7,768,959 B1* | 8/2010 | Chen | G06F 9/455 718/1 |
| 9,378,036 B1* | 6/2016 | Sarcar | H04L 49/3045 |
| 9,503,278 B2* | 11/2016 | Abidi | H04L 12/465 |
| 2003/0026209 A1* | 2/2003 | Katz | H04L 45/50 370/403 |
| 2012/0198446 A1* | 8/2012 | Sawa | G06F 9/45558 718/1 |
| 2012/0291029 A1* | 11/2012 | Kidambi | H04L 49/70 718/1 |
| 2013/0107699 A1* | 5/2013 | Miclea | H04L 45/68 370/228 |
| 2013/0132952 A1* | 5/2013 | Shah | G06F 9/45558 718/1 |
| 2014/0181340 A1* | 6/2014 | Parthasarathy | G06F 13/382 710/107 |
| 2014/0254604 A1* | 9/2014 | Janardhanan | H04L 45/18 370/401 |

(Continued)

*Primary Examiner* — Ninos Donabed
(74) *Attorney, Agent, or Firm* — Lowenstein Sandler LLP

(57) ABSTRACT

Technologies for configuring flexible hardware-accelerated rules in a Service Function Chaining (SFC) architecture are described. A DPU includes an acceleration hardware engine to provide a single accelerated data plane, and a processing device that generates a first virtual bridge and a second virtual bridge. The first virtual bridge is controlled by a first network service hosted on the DPU and has a first set of one or more network rules. The second virtual bridge has a second set of one or more user-defined network rules. The processing device generates a combined set of network rules based on the first set of one or more network rules and the second set of one or more user-defined network rules. The acceleration hardware engine processes network traffic data in the single accelerated data plane using the combined set of network rules.

20 Claims, 15 Drawing Sheets

(56) References Cited

U.S. PATENT DOCUMENTS

| | | | |
|---|---|---|---|
| 2016/0156550 A1* | 6/2016 | Song | H04L 12/44 |
| | | | 370/256 |
| 2018/0063074 A1* | 3/2018 | Shankarappa | G06F 8/65 |
| 2018/0088977 A1* | 3/2018 | Gray | H04L 43/087 |
| 2019/0052480 A1* | 2/2019 | Skidmore | H04L 12/4625 |
| 2022/0046462 A1* | 2/2022 | De Andrade Jardim | |
| | | | H04W 28/02 |
| 2024/0095057 A1* | 3/2024 | Borgonovo | G06F 13/387 |
| 2024/0267337 A1* | 8/2024 | Byun | H04W 28/02 |

* cited by examiner

HARDWARE-ACCELERATED FLEXIBLE STEERING RULES OVER SERVICE FUNCTION CHAINING (SFC)

RELATED APPLICATIONS

This application is related to co-pending U.S. Application No. 18/649,319, filed concurrently, entitled "NETWORK PIPELINE ABSTRACTION LAYER (NPAL) OPTIMIZED PIPELINE FOR NETWORK ACCELERATION," and co-pending U.S. Application No. 18/649,334, filed concurrently, entitled "CONFIGURABLE AND DYNAMIC SERVICE FUNCTION CHAINING (SFC) INTERFACE MAPPING ON A DATA PROCESSING UNIT (DPU)."

TECHNICAL FIELD

At least one embodiment pertains to processing resources used to perform and facilitate operations for providing hardware-accelerated flexible steering rules over service function chaining (SFC) architectures. For example, at least one embodiment pertains to processors or computing systems that enable an acceleration hardware engine to process network traffic data in a single accelerated data plane by utilizing a combined set of network rules derived from multiple virtual bridges, each having distinct steering rules, according to various novel techniques described herein.

BACKGROUND

In traditional network architectures, various security and performance functions were managed by specialized hardware devices known as middleboxes, each serving distinct roles. Firewalls, as standalone physical appliances, served as the primary defense mechanism at the network's edge, scrutinizing incoming and outgoing traffic based on set rules to block or allow data transmission, thereby safeguarding the internal network from external threats. Load balancers operated as separate hardware units, intelligently distributing incoming network and application traffic across multiple servers to prevent overload and ensure efficient resource utilization, thus enhancing application availability and performance. Intrusion Detection Systems (IDS), positioned strategically within the network, were dedicated to monitoring and analyzing network traffic for signs of anomalies, attacks, or security policy violations, acting as a security component in identifying potential breaches.

Additionally, networks utilize other middlebox functions such as Data Loss Prevention (DLP) systems to monitor and prevent unauthorized data exfiltration, virtual private network (VPN) Gateways to establish secure and encrypted connections across networks, and Wide Area Network (WAN) Optimization appliances designed to improve data transfer efficiency across wide area networks. While essential, these middleboxes presented challenges: they required significant capital investment, occupied valuable data center space, and demanded specialized personnel for operation and maintenance. Scaling these network functions often meant acquiring and integrating more physical devices, which added to the complexity and cost of the network infrastructure.

BRIEF DESCRIPTION OF DRAWINGS

Various embodiments in accordance with the present disclosure will be described with reference to the drawings, in which.

DETAILED DESCRIPTION

Figure 1:
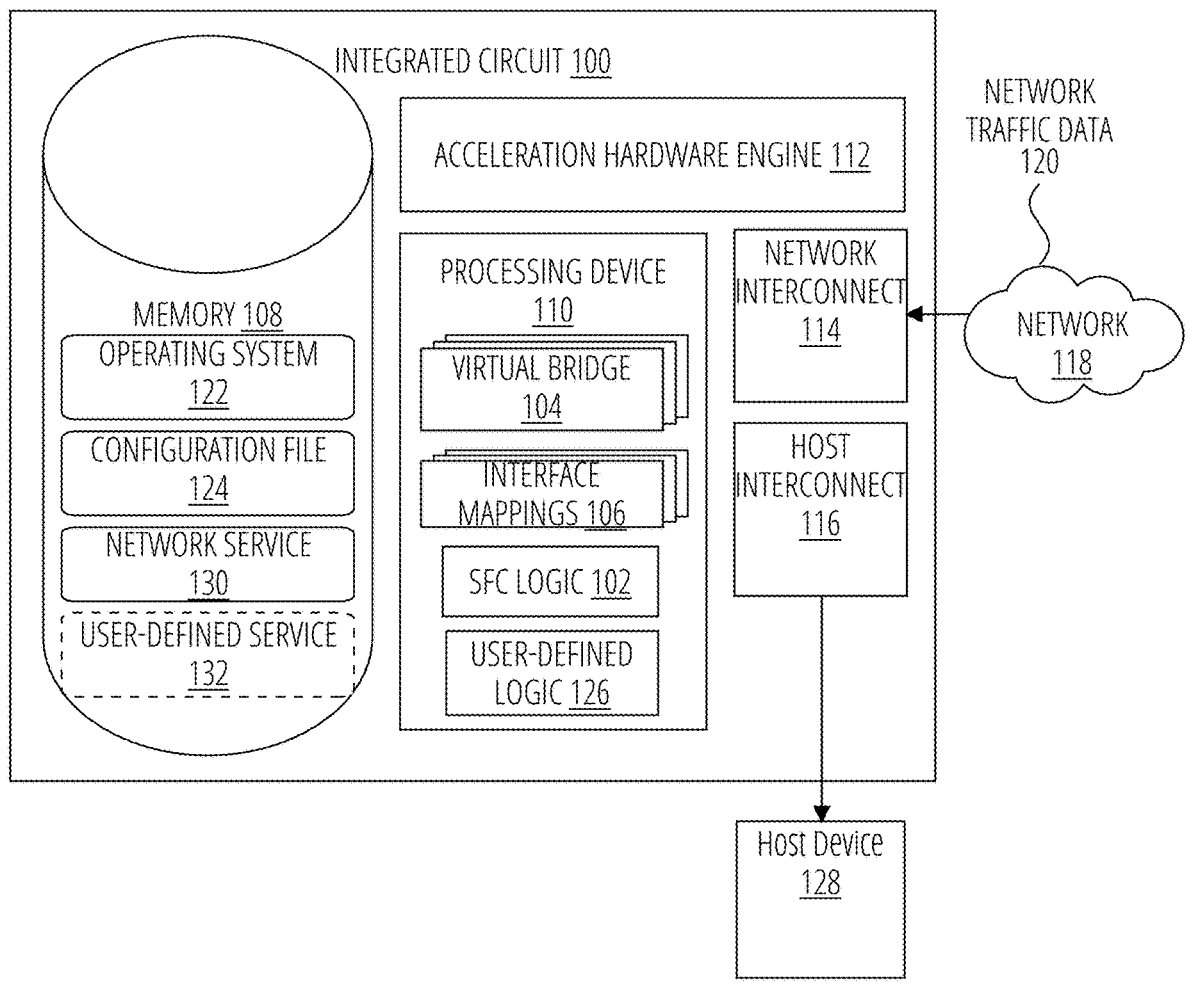
FIG. 1 is a block diagram of an integrated circuit with a Service Function Chaining (SFC) logic for generating virtual bridges and interface mappings in an SFC architecture according to at least one embodiment.

Technologies for providing hardware-accelerated flexible steering rules over service function chaining (SFC) architectures are described. Also, technologies for optimizing network acceleration using a network pipeline abstraction layer are described. Also, technologies for providing configurable and dynamic SFC interfaces on a data processing unit (DPU) are described. DPUs are described in more detail below.

As described above, in traditional network architectures, various security and performance functions were managed by specialized hardware devices known as middleboxes (e.g., firewalls, load balancers, IDSs, etc.). Traditional networks were designed with the assumption that all resources would be housed within an on-premises data center, and often characterized by a centralized model.

Modern networks are increasingly cloud-centric, designed to support cloud services and applications. This includes the use of public, private, and hybrid cloud infrastructures, requiring networks to be more flexible and scalable. Unlike traditional network architectures that rely heavily on physical hardware (i.e., each network function requires its own dedicated device), current network architectures leverage virtualization technologies, such as software-defined networking (SDN) and network function virtualization (NFV). This allows network resources to be abstracted from hardware, providing greater flexibility, cashier management, and reduced costs. Modern networks increasingly use automation and orchestration tools to manage network resources efficiently, reduce operational overhead, and enable faster deployment of network services. Modern networks are designed for scalability and high performance, utilizing technologies like edge computing to process data closer to the source and reduce latency. Current network architectures are more flexible, scalable, and efficient than traditional ones, designed to support the dynamic and distributed nature of modern computing resources and work practices. They integrate advanced technologies like cloud services, virtualization, and automation to meet the demands of today's digital environment.

Service Function Chaining (SFC) Architectures

One networking concept and architecture used in SDN and NFV environments is Service Function Chaining (SFC). SFC can be used to define and orchestrate an order of network services through a series of interconnected network nodes. SFC aims to virtualize network services (e.g., firewalls, load balancers, IDSs, and other middlebox functions) and define the sequence in which network traffic data passes through them to achieve specific processing or treatment. Each network service is represented as a Service Function (SF). These SFs can be implemented as virtualized software instances running on physical or virtual infrastructure. A Service Chain defines the sequence of SFs through which network traffic data passes. For example, a service chain might specify that network traffic data first goes through a firewall, then a load balancer, and finally an IDS using Service Function Paths (SFPs) and Service Function Forwarders (SFFs). The SFP refers to the defined sequence of scalable functions (SFs) through which network traffic data is steered in a specific order. An SFP is a logical representation of the path that network traffic data will follow through the network, traversing various service functions, such as firewalls, load balancers, IDSs, and so on. The SFP dictates the flow of traffic and ensures that it passes through each designated service function in the correct sequence. The SFP can be used for implementing policy-based routing and network services in a flexible and dynamic manner. The SFF is a component within the SFC architecture that is responsible for the actual forwarding of network traffic data to the designated service functions as specified by the SFP. The SFF acts as a router or switch that directs traffic between different service functions and ensures that the network traffic data follows the prescribed path defined by the SFP. The SFF makes decisions on where to send the network traffic data next, based on SFC encapsulation information and the SFP. It handles the routing and forwarding between service functions and deals with any traffic encapsulation and de-encapsulation used for SFC operation. For example, when a packet enters a network, it is classified based on its attributes (such as source/destination Internet Protocol (IP) addresses, protocols, ports, etc.), and the appropriate SFP is selected to determine the path through the appropriate SFs. The packet is then steered along the SFP by SFFs.

Service Function Chaining offers several benefits, including increased flexibility, scalability, and agility in deploying and managing network services. It enables dynamic creation of service chains based on application requirements, traffic conditions, or policy changes, leading to more efficient and customizable network service delivery.

Current solutions in SFC architectures do not support the creation and use of flexible steering rules in a single accelerated data plane on a DPU. Current solutions in SFC architectures do not support configurable and dynamic interface mappings on the DPU. Current solutions do not always support acceleration of all operations of an SFC architecture.

Aspects and embodiments of the present disclosure address these problems and others by providing technologies for hardware-accelerated flexible steering rules over SFC architectures of a DPU, configurable and dynamic SFC interfaces on a DPU, and/or optimizing network acceleration using a network pipeline abstraction layer as described in more detail below. Aspects and embodiments of the present disclosure can provide and enable virtual bridges with different steering rules to an acceleration hardware engine to process network traffic data in a single accelerated data plane using a combined set of network rules from different steering rules from different virtual bridges. Aspects and embodiments of the present disclosure can provide and enable a network pipeline abstraction layer that supports multiple network protocols and network functions in a network pipeline, where the pipeline includes a set of tables and logic organized in a specific order to be accelerated by the acceleration hardware engine. Aspects and embodiments of the present disclosure can provide and enable a first virtual bridge, a second virtual bridge, and a virtual port between the first virtual bridge and the second virtual bridge, where the first virtual bridge is controlled by a first network service hosted on the DPU and the second virtual bridge is controlled by a user-defined logic.

Data Processing Units (DPUS)

In modern network architectures, a DPU can be used to provide a set of software-defined networking, storage, security, and management services at a data-center scale with the ability to offload, accelerate, and isolate data center infrastructure. The DPU can offload processing tasks that a server's central processing unit (CPU) normally handles, such as any combination of encryption/decryption, firewall, transport control protocol/Internet Protocol (TCP/IP), and HyperText Transport Protocol (HTTP) processing, and networking operations. A DPU can be an integrated circuit or a System on a Chip (SoC) that is considered a data center infrastructure on a chip. The DPU can include DPU hardware and DPU software (e.g., a software framework with acceleration libraries). The DPU hardware can include a CPU (e.g., a single-core or multi-core CPU), one or more hardware accelerators, memory, one or more physical host interfaces that operatively couple to one or more host devices (e.g., a CPU of a host device), and one or more physical network interfaces that operatively couple to a network (e.g., a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof). The DPU can handle network data path processing of network traffic data, whereas a host device can control path initialization and exception processing. The acceleration hardware engine (e.g., DPU hardware) can be used to offload and filter network traffic based on predefined filters using the hardware capabilities of the acceleration hardware engine. The software framework and acceleration libraries can include one or more hardware-accelerated services, including a hardware-accelerated service (e.g., NVIDIA DOCA), hardware-accelerated virtualization services, hardware-accelerated networking services, hardware-accelerated storage services, hardware-accelerated artificial intelligence/machine learning (AI/ML) services, hardware-accelerated security service, and hardware-accelerated management services.

A DPU can provide accelerated networking services (also referred to as Host Based Network service (HBN) service) to one or more host devices. The DPU network services can be used for accelerating Layer 2 (L2) protocols, Layer 3 (L3) protocols, tunneling protocols, or the like, on the DPU hardware. The HBN infrastructure is based on SFC topology, where a single virtual bridge (e.g., Open vSwitch (OVS) bridge) is controlled by the HBN service, providing all accelerated networking capabilities. The HBN service can support different protocols and network capabilities, such as Access Control Lists (ACLs), Equal-Cost Multi-Path (ECMP), tunneling, Connection Tracking (CT), Quality of Service (QOS) rule, Spanning Tree Protocol (STP), virtual local area network (VLAN) mapping, network address translations (NATs), software-defined networking (SDN), multi-protocol label switching (MPLS), etc.

Configurable and Dynamic SFC Interfaces Mapping on DPU

Aspects and embodiments of the present disclosure can provide, in addition to a first virtual bridge that is controlled by an HBN service, a second virtual bridge that can be controlled by user-defined logic. The second virtual bridge can be programmable by a user, or a customer, or a controller, such as an Open Virtual Network (OVN) controller. OVN is an open-source project designed to provide network virtualization to virtual machines (VMs) and container instances. OVN acts as an extension to OVS, which is a virtual switch primarily used to enable network automation in large-scale network environments. OVN complements OVS by adding native support for virtual network abstractions, such as virtual L2 and L3 overlays and security groups. Aspects and embodiments of the present disclosure can support configurable and dynamic interfaces mapping on the DPU based on SFC infrastructure. The configuration can be supported as part of the DPU's operating system (OS) installation, as well as dynamically for DPUs in production. The configuration can be done in deployed DPUs without reinstallation of the DPU OS. The interface configuration in the configuration file can support different use-cases for network acceleration on the DPU.

In at least one embodiment, the DPU includes memory to store a configuration file that specifies multiple virtual bridges, such as the first and second virtual bridges described above. The configuration file also specifies interface mappings for the multiple virtual bridges. The DPU includes a processing device that is operatively coupled to the memory. The processing device generates a first virtual bridge and a second virtual bridge according to the configuration file. The first virtual bridge is controlled by a first network service hosted on the DPU and the second virtual bridge is controlled by user-defined logic. The processing device adds one or more host interfaces to the second virtual bridge, adds a first service interface to the first virtual bridge to operatively couple to the first network service, and adds one or more virtual ports between the first virtual bridge and the second virtual bridge, all according to the configuration file. The second virtual bridge provides flexibility to the user, customer, or controller to define additional network functions, different network functions than those performed by the first network service. In one implementation, a second network service includes the user-defined logic. The processing device adds a second service interface to the second virtual bridge to operatively couple to the second network service. Alternatively, the user-defined logic can be implemented in the second virtual bridge itself or logic operatively coupled to the second virtual bridge.

Hardware-Accelerated Flexible Steering Rules of SFC Architecture of DPU

Aspects and embodiments of the present disclosure can provide a second virtual bridge to allow a user, a customer, or a controller to specify flexible steering rules over SFC architecture of a DPU. Using an SFC on the DPU, a user (or controller) can create flexible and dynamic network steering rules which are accelerated by DPU hardware as a single data plane on the DPU. In particular, the user-defined rules can be accelerated with the existing networking rules in the HBN service in a single accelerated data plane as described in more detail herein. The user (or controller) can program in a flexible manner different steering rules over the SFC in parallel to the HBN service, which will result in a single accelerated data plane by the DPU hardware and DPU software. The hardware-accelerated service of the DPU can include an OVS infrastructure that is based on the open-source OVS with additional features and new acceleration capabilities. For example, the hardware-accelerated service can include the OVS-DOCA technology, developed by Nvidia Corporation of Santa Clara, California. OVS-DOCA, which is an OVS infrastructure for DPU, is based on the open-source OVS with additional features, new acceleration capabilities, and the OVS backend is purely DOCA based. The hardware-accelerated service can also support OVS-Kernel and OVS-DPDK, which are common modes. All three operation modes make use of flow offloads for hardware acceleration, but due to its architecture and use of DOCA libraries, the OVS-DOCA mode provides the most efficient performance and feature set among them. The OVS-DOCA mode can leverage the DOCA Flow library to configure and use the hardware offload mechanisms and application techniques to generate a combined set of network rules that is used by the acceleration hardware engine to process network traffic data in a single accelerated data plane. Using a defined SFC infrastructure in a configuration file, users and customers can leverage the DPU as a networking accelerator on an edge device without the need for sophisticated and smart switches in different network topologies in data center (DC) networks and in Service Provider (SP) networks.

In at least one embodiment, the DPU includes an acceleration hardware engine to provide a single accelerated data plane. The DPU includes memory to store a configuration file specifying at least a first virtual bridge, a second virtual bridge, and a virtual port between the first virtual bridge and the second virtual bridge. A processing device of the DPU is operatively coupled to the memory and the acceleration hardware engine. The processing device generates the first virtual bridge and the second virtual bridge according to the configuration file. The first virtual bridge is controlled by a first network service hosted on the DPU and has a first set of one or more network rules. The second virtual bridge has a second set of one or more user-defined network rules. The processing device adds the virtual port between the first virtual bridge and the second virtual bridge according to the configuration file. The processing device generates a combined set of network rules based on the first set of one or more network rules and the second set of one or more user-defined network rules. The acceleration hardware engine can process network traffic data in the single accelerated data plane using the combined set of network rules.

Network Pipeline Abstraction Layer (NPAL) Optimized Pipeline for Network Acceleration Aspects and embodiments of the present disclosure can provide NPAL, which is a software programmable layer, to provide an optimized network pipeline that supports different accelerated network capabilities, such as L2 bridging, L3 routing, tunnel encapsulation, tunnel decapsulation, hash calculations, ECMP operations, static and dynamic ACLs, CT, etc. The NPAL can be similar to a database abstraction layer (DAL). A DAL is a programming concept used in software engineering to provide an abstraction over the underlying database systems, allowing applications to interact with different databases, low-level software layers, or hardware directly without needing to change the application code. A DAL typically includes a set of applications programming interfaces (APIs) or classes that provide a unified interface for performing common database operations, such as querying, inserting, updating, and deleting data. By using the DAL, developers can write database-independent code, reducing the coupling between the application and the specific database implementation. Similarly, the NPAL can include a set of APIs or classes that provide a unified interface for performing common networking operations in a network pipeline that is optimized for hardware acceleration on the DPU hardware. In particular, the NPAL can provide a unified interface to one or more applications, network services, or the like, executed by the DPU or host device. NPAL can provide an optimized network pipeline that supports multiple network protocols and functionality. The network pipeline can include a set of tables and logic in a specific order, the network pipeline being optimized to be accelerated by the DPU hardware, providing customers and users with a rich set of capabilities and high performance.

Using an NPAL in the DPU can provide various benefits, including operational independence, encapsulation of logic, performance, code reusability, platform independence, or the like. For example, developers can write agnostic code, allowing applications (e.g., network services) to work with different underlying access logic and network functionality. The NPAL can encapsulate the access or network function-related logic, making it easier to manage and maintain the codebase. Changes to the schema or underlying technology can be isolated within the NPAL implementation. The NPAL can provide an optimized and high-performance pipeline to address different networking requirements and functionality. By separating access logic from application logic, developers can reuse the NPAL components across multiple parts of the application (network service), promoting code reuse and maintainability. The NPAL can abstract away platform-specific differences, data types, and other access or network function-related features, enabling the application (network service) to run on different platforms and environments seamlessly. Overall, the NPAL can be a powerful tool for building flexible, scalable, and maintainable network function-driven applications, offering a level of abstraction that simplifies interactions between network functions and promotes code efficiency and portability.

In at least one embodiment, the DPU includes DPU hardware, including a processing device and an acceleration hardware engine. The DPU includes memory operatively coupled to the DPU hardware. The memory can store DPU software including an NPAL that supports multiple network protocols and network functions in a network pipeline. The network pipeline includes a set of tables and logic organized in a specific order to be accelerated by the acceleration hardware engine. The acceleration hardware engine can process network traffic data using the network pipeline. The network pipeline can be optimized for network services running on the DPU.

OVS and OVS Bridges

Open vSwitch (OVS) is an open-source, multi-layer virtual switch that is used to manage network traffic in virtualized environments, particularly in data centers and cloud computing platforms. OVS provides network connectivity between virtual machines (VMs), containers, and physical devices. OVS is widely used in virtualization and cloud technologies and is a typical component of many software-defined networking (SDN) and network virtualization solutions.

A virtual switch, often found in virtualized computing environments, is a software application that allows virtual machines (VMs) on a single physical host to communicate with each other and with the external network. The virtual switch can provide network connectivity between VMs, containers, and physical devices. The virtual switch can emulate the functionality of a physical network switch but operate at a software level within a hypervisor or a host operating system. The virtual switch can manage network traffic, directing data packets between VMs on the same host or between VMs and the physical network using ports. These ports can be configured for various policies like security settings, Quality of Service (Qos) rules, etc. The virtual switch can segment network traffic to provide isolation between different virtual networks. The virtual switch can provide an interface between the virtualized environment and the physical network, allowing VMs to communicate outside their host. The virtual switch can support standard networking protocols and features, such as virtual local area network (VLAN) tagging, Layer 2 forwarding, Layer 3 capabilities, and the like. OVS can support the OpenFlow Protocol, allowing the virtual switch to be controlled by a network controller to make decisions about how traffic should be routed through the network. A network controller, such as a software-defined networking (SDN) controller, is a centralized entity that manages flow control to the networking devices. It is the 'brain' of the network, maintaining a comprehensive view of the network and making decisions about where to send packets. The OpenFlow (OF) Protocol enables the controller to interact directly with the forwarding plane of network devices, such as switches and routers, both physical and virtual. An OF configuration refers to the setup and management of network behavior using the OpenFlow protocol within an SDN environment. It involves defining flow rules and actions to control how traffic is handled by network devices, usually managed centrally by an SDN controller. An OF configuration can include flow tables that contain rules for how packets should be handled. Each flow table contains a set of flow entries. The flow entry defines what to do with packets that match certain criteria. An entry can have three parts: match fields, actions, and counters. The match fields define packet attributes to match, such as source/destination Internet Protocol (IP) addresses, Media Access control (MAC) addresses, port numbers, VLAN tags, etc. The Actions can define what to do with a matching packet, such as forwarding it to a specific port, modifying fields in the packet, or dropping it. The counters can be used to keep track of the number of packets and bytes for each flow. The network controller can use control messages to manage flow entries in the switches. It can add, update, or delete flow entries. Optional configurations can include group tables for more advanced forwarding actions like multicasting, load balancing, etc. It should be noted that OVS is one type of virtual switch technology, but there are other virtual switch technologies, such as SDN-based switches.

An OVS bridge acts like a virtual network switch at the software level, allowing multiple network interfaces to be connected and managed as if they were ports on a physical switch. The OVS bridge can enable the creation and management of virtual networks within a server or across multiple servers in a data center or cloud environment. An OVS bridge connects virtual and physical network interfaces, facilitating communication between them. This can include interfaces from VMs, containers, physical network interfaces, or even other virtual bridges. Similar to a physical Ethernet switch, an OVS bridge operates at Layer 2 (L2) of the Open Systems Interconnection model (referred to as the OSI model), forwarding, filtering, and managing traffic based on Media Access Control (MAC) addresses. An OVS bridge can support advanced features such as virtual local area network (VLAN) tagging, Quality of Service (QOS), traffic mirroring, and Access Control Lists (ACLs), among others. An OVS bridge can be controlled by a controller using protocols like OpenFlow (OF), allowing for dynamic and programmable network configurations.

Some aspects and embodiments of the present disclosure are described herein with respect to OVS and include terminology that is specific to OVS and OpenFlow. However, some aspects and embodiments of the present disclosure can be used in other virtual switching and bridging technologies. Similarly, various embodiments are described in the context of a DPU, but can also be used in other virtual switch environments, including virtual bridges, switches, network interface cards (NICs) (also referred to as network interface controller), smart NICs, network interface devices, network switches, intelligence processing units (IPUs), or other specialized computing devices designed to offload specific tasks from the CPU of a computer or server.

DPUs are specialized semiconductor devices designed to offload and accelerate networking, security, and storage tasks that traditionally run on server CPUs. By taking over these functions, DPUs aim to significantly improve overall data center efficiency and performance. They are equipped with their own processors and memory, enabling them to handle complex data processing tasks independently of the host CPU. DPUs are embedded into the data center infrastructure, where they manage data movement and processing across networks, freeing up CPU resources to focus more on application and workload processing. This architectural shift allows for increased workload density, improved data throughput, and enhanced security measures at the hardware level. DPUs play a pivotal role in software-defined networking (SDN), providing hardware acceleration for advanced functions such as encryption, traffic management, and virtualization. By optimizing these crucial operations, DPUs contribute to the creation of more agile, secure, and efficient data centers.

IPUs are specialized hardware accelerators designed to optimize the performance of machine learning algorithms and artificial intelligence (AI) workloads. Unlike general-purpose CPUs or Graphics Processing Units (GPUs), which are versatile but may not be optimized for AI tasks, IPUs are engineered specifically to handle the high computational demands and data throughput requirements of deep learning models and neural network processing. They achieve this by implementing highly parallel computation architectures and memory systems that can efficiently process the large volumes of data associated with AI applications. IPUs aim to reduce the latency and increase the speed of AI computations, enabling more complex models to be trained more quickly and efficiently.

Smart NICs are advanced network interface cards equipped with built-in processing power to offload networking tasks from the CPU, thereby enhancing the efficiency and performance of data processing within servers. Unlike traditional NICs, which primarily serve as conduits for data between servers and networks, Smart NICs can execute a wide range of network functions directly on the card, such as traffic management, encryption/decryption, and network virtualization tasks. These capabilities allow Smart NICs to significantly reduce CPU load, freeing up resources to improve the overall processing capabilities of the server for application workloads. By handling complex networking functions, Smart NICs can lead to lower latency and higher throughput in data center environments, making them particularly valuable in scenarios requiring real-time processing and high-speed networking, such as cloud computing, high-performance computing (HPC), and enterprise data centers. The intelligence and programmability of Smart NICs provide a flexible solution to meet the evolving demands of modern networking infrastructures, contributing to more efficient and customizable networking operations.

FIG. 1 is a block diagram of an integrated circuit 100 with an SFC logic 102 for generating virtual bridges 104 and interface mappings 106 in an SFC architecture according to at least one embodiment. The integrated circuit 100 can be a DPU, a NIC, a Smart NIC, a network interface device, or a network switch. The integrated circuit 100 includes a memory 108, a processing device 110, an acceleration hardware engine 112, a network interconnect 114, and a host interconnect 116. The processing device 110 is coupled to the memory 108, the acceleration hardware engine 112, the network interconnect 114, and the host interconnect 116. The processing device 110 hosts the virtual bridges 104 generated by the SFC logic 102. A virtual bridge 104 (also referred to as a virtual switch) is software that operates within a computer network to connect different segments or devices, much like a physical network bridge, but in a virtualized environment. It is a core component in network virtualization, enabling the connection of virtual machines (VMs), containers, and other virtual network interfaces to each other and to the physical network, simulating traditional Ethernet network functions purely in software. Virtual bridges 104 allow for the creation and management of isolated network segments within a single physical infrastructure, facilitating communication, enforcing security policies, and providing bandwidth management, all while offering the flexibility and scalability needed in dynamic virtualized and cloud environments. The virtual bridges 104 can be Open vSwitch (OVS) bridges. An OVS bridge functions as a virtual switch at the heart of the Open vSwitch architecture, enabling advanced network management and connectivity in virtualized environments. It operates by aggregating multiple network interfaces into a single logical interface, managing the traffic flow between VMs on the same physical host, as well as the external network. Unlike traditional virtual bridges, the OVS bridge supports a wide array of networking features, such as VLAN tagging, traffic monitoring with sFlow and NetFlow, Quality of Service (QOS), and Access Control Lists (ACLs), offering enhanced flexibility and control for network administrators. The OVS bridge efficiently directs network traffic, based on pre-defined policies and rules, providing an essential tool for building complex, multi-tenant cloud and data center networks.

In particular with respect to FIG. 1, the virtual bridges 104 can provide network connectivity between VMs executed on the same integrated circuit 100 or a separate host device, container, and/or physical device. In short, the virtual bridges 104 allows VMs on a single physical host to communicate with each other and with the external network 118. The virtual bridges 104 can emulate the functionality of a physical network switch but operate at a software level within the integrated circuit 100. The virtual bridges 104 can manage network traffic data 120, directing data packets between VMs on the same host or between VMs and the physical network using ports. These ports can be configured for various policies like security settings, QoS rules, etc. The virtual bridges 104 can segment network traffic to provide isolation between different virtual networks. The virtual bridges 104 can provide an interface between the virtualized environment and the physical network, allowing VMs to communicate outside their host. The virtual bridges 104 can support standard networking protocols and features, such as VLAN tagging, Layer 2 (L2) forwarding, Layer 3 (L3) capabilities, tunneling protocols (e.g., Virtual Extensive LAN (VXLAN), Generic Routing Encapsulation (GRE), and the Geneve protocol), flow-based forwarding, OpenFlow Support, integration with virtualization platforms (e.g., VMware, KVM, Xen, and others, enabling network connectivity for virtual machines and containers), extensibility, traffic monitoring and mirroring, security, multi-platform support (e.g., Linux, FreeBSD, Windows, etc.), and the like. For Layer 2 Switching, one or more of the virtual bridges 104 acts as a Layer 2 Ethernet switch, enabling the forwarding of Ethernet frames between different network interfaces, including virtual and physical ports. For Layer 3 Routing, one or more of the virtual bridges 104 supports Layer 3 IP routing, allowing it to route traffic between different IP subnets and perform IP-based forwarding. The virtual bridges 104 can support VLAN tagging and allow for the segmentation of network traffic into different VLANs using VLAN tagging. The virtual bridges 104 can use flow-based forwarding where network flows are classified based on their characteristics, and packet forwarding decisions are made based on flow rules, as well as enforce security policies and access control. OVS is commonly used in data center and cloud environments to provide network agility, flexibility, and automation. It plays a vital role in creating and managing virtual networks, enabling network administrators to adapt to the changing demands of modern, dynamic data centers.

In at least one embodiment, the virtual bridges 104 can use the OVS and OF technologies. The virtual bridges 104 can be controlled by a network controller (also referred to as a network service) to make decisions about how traffic should be routed through the network. As described herein, a network controller (e.g., SDN controller) is a centralized entity that manages flow control to the networking devices. The OF protocol can be used to interact directly with the forwarding plane of network devices, such as virtual or physical switches and routers. In at least one embodiment, the virtual bridges 104 can use flow tables that contain rules for how packets should be handled. Each flow table contains a set of flow entries. The flow entry defines what to do with packets that match certain criteria. An entry can have three parts: match fields, actions, and counters. The match fields define packet attributes to match, such as source/destination Internet Protocol (IP) addresses, Media Access control (MAC) addresses, port numbers, VLAN tags, etc. The actions can define what to do with a matching packet, such as forwarding it to a specific port, modifying fields in the packet, or dropping it. The counters can be used to keep track of the number of packets and bytes for each flow. Since the virtual bridges 104 are virtualized, the virtual bridges 104 can create rules at a software level, a data path (DP) level, and at a hardware level. A rule created at the software level is referred to as a software (SW) rule or an OF rule. A rule created at the DP level is referred to as a DP rule. A rule created at the hardware level is referred to as a hardware (HW) rule. When a SW rule is created, corresponding DP and HW rules are created. A network controller can add, update, or delete flow entries, changing the configuration settings.

In another embodiment, the virtual bridges 104 are a Standard Virtual Switch or a Distributed Virtual Switch. In another embodiment, the virtual bridges 104 are an SDN-based switch that is integrated with an SDN controller. The integrated circuit 100 can be used in data centers, cloud computing environments, development and testing environments, network function virtualization (NFV) environments, or the like. The virtual bridges 104 can be used in a data center where server virtualization is common to facilitate communication within and between servers efficiently. The virtual bridges 104 in the cloud computing environment can enable multi-tenant networking, allowing different clients to have isolated network segments. The virtual bridges 104 can allow network function virtualizations (e.g., NFVs) to be connected and managed within virtual infrastructures. Some advantages of the virtual bridges 104 are that they can be easily configured or reconfigured without physical intervention, can reduce the need for physical network hardware and associated maintenance, and offer the ability to create isolated networks for different applications or tenants. In summary, the virtual bridges 104 are a software-based device that performs the networking functionalities of a physical switch in a virtualized environment (e.g., data centers and cloud computing environments) and provides flexibility, isolation, and efficient network management in the virtualized environment.

In at least one embodiment, the integrated circuit 100 can also host one or more hypervisors and one or more virtual machines (VMs). The network traffic data 120 can be directed to the respective VM by the virtual bridges 104.

During operation, the SFC logic 102 can use a configuration file 124 to generate the virtual bridges 104 and interface mappings 106 between the virtual bridges 104, the network interconnect 114, and the host interconnect 116. The configuration file 124 can specify the virtual bridges 104, the interface mappings 106, and the configurations for each. The SFC logic 102 can generate, according to the configuration file 124, a first virtual bridge and a second virtual bridge. The first virtual bridge is to be controlled by a first network service 130 hosted on the integrated circuit 100, and the second virtual bridge is to be controlled by user-defined logic 126. The SFC logic 102 can add one or more host interfaces to the second virtual bridge and a first service interface to the first virtual bridge to operatively couple to the first network service 130. The SFC logic 102 can add one or more virtual ports between the first virtual bridge and the second virtual bridge.

In at least one embodiment, the user-defined logic 126 is part of a user-defined service 132, such as a user-defined network service, hosted on the integrated circuit 100. The SFC logic 102 can add, according to the configuration file 124, a second service interface to the second virtual bridge to operatively couple to the user-defined service 132. The user-defined service 132 can be a user-defined security service, a user-defined telemetry service, a user-defined storage service, or the like.

In at least one embodiment, the integrated circuit 100 stores an operating system 122 (OS 122) in memory 108. The OS 122 can execute on the processing device 110. In at least one embodiment, the SFC logic 102 generates the virtual bridges 104 and the interface mappings 106 as part of installation of the OS 122 on the integrated circuit 100. In another embodiment, the SFC logic 102 can generate the virtual bridges 104 and the interface mappings 106 at runtime of the integrated circuit 100 and without reinstallation of the OS 122 on the integrated circuit 100. In at least one embodiment, the SFC logic 102 can configure, according to the configuration file 124, an OS property (e.g., page size) associated with the OS 122 in one of the virtual bridges 104.

In at least one embodiment, the SFC logic 102 can perform and facilitate operations for identifying a change to a configuration setting of the virtual bridges 104 in the configuration file 124 (or a new configuration file). The SFC logic 102 can configure the virtual bridges 104 and interface mappings 106 accordingly, during installation or during runtime and without reinstallation of the operating system 122.

As illustrated in FIG. 1, the SFC logic 102 is implemented in the integrated circuit 100 with memory 108, processing device 110, the acceleration hardware engine 112, the network interconnect 114, and the host interconnect 116. In other embodiments, the SFC logic 102 can be implemented on processors, computing systems, CPUs, DPUs, smart NICs, IPUs, or the like. The underlying hardware can host the virtual bridges 104 and interface mappings 106.

In at least one embodiment, the integrated circuit 100 can be deployed in a Data Center (DC) network or a Service Provider (SP) network. A data center (DC) network is the foundational infrastructure that facilitates communication, data exchange, and connectivity between different computational resources, storage systems, and networking devices within a data center. It is designed to support high-speed data transmission, reliable access to distributed resources, and efficient management of data flows across various physical and virtual platforms. At its core, a DC network integrates a multitude of switches, routers, firewalls, and load balancers, orchestrated by advanced networking protocols and software-defined networking (SDN) technologies to ensure optimal performance, scalability, and security. The architecture of a DC network typically includes both the physical backbone, with high-capacity cables and switches ensuring bandwidth and redundancy, and the virtual overlay, which enables flexibility, quick provisioning, and resource optimization through virtual networks. A well-designed DC network supports a range of applications, from enterprise services to cloud computing and big data analytics, by providing the infrastructure to handle the massive amounts of data, complex computations, and application workloads typical of modern data centers. It plays a crucial role in disaster recovery, data replication, and high availability strategies, ensuring that data center services remain resilient against failures and efficient under varying loads. A Service Provider (SP) network refers to the expansive, high-capacity communication infrastructure operated by organizations that offer various telecommunications, internet, cloud computing, and digital services to businesses, residential customers, and other entities. These networks are engineered to provide wide-ranging coverage, connecting numerous geographical locations, including urban centers, remote areas, and international destinations, to facilitate global communication and data exchange. The architecture of an SP network is multi-layered, incorporating a mix of technologies such as fiber optics, wireless transmission, satellite links, and broadband access to achieve widespread connectivity. Central to these networks are high-performance backbone networks, which are responsible for the high-speed transmission of massive volumes of data across long distances. On top of the physical infrastructure, SP networks deploy advanced networking technologies, including MPLS, software-defined networking (SDN), and network function virtualization (NFV), to enhance the efficiency, flexibility, and scalability of service delivery. Service Provider networks are designed to support a vast array of services, from conventional voice and data services to modern cloud-based applications and streaming services, addressing the evolving demands of consumers and businesses alike. They are crucial for the implementation of the internet, mobile communications, enterprise networking solutions, and the emerging Internet of Things (IoT) ecosystem, ensuring connectivity and accessibility to digital resources and services on a global scale.

In at least one embodiment, the virtual bridges 104 and interface mappings 106 are part of a service function chaining (SFC) architecture implemented in at least one of a DPU, a NIC, a SmartNIC, a network interface device, or a network switch. In at least one embodiment, the SFC logic 102 can be implemented as part of a hardware-accelerated service on an agentless hardware product, such as a DPU, as illustrated and described below with respect to FIG. 2. That is, the integrated circuit 100 can be a DPU. The DPU can be a programmable data center infrastructure on a chip. The hardware-accelerated service can be part of the NVIDIA OVS-DOCA, developed by Nvidia Corporation of Santa Clara, California. OVS-DOCA, which serves as the new OVS infrastructure for DPU, is based on the open-source OVS and includes additional features, new acceleration capabilities, and a purely DOCA-based OVS backend. Alternatively, the SFC logic 102 can be part of other services.

Service Function Chaining (SFC) Infrastructures

SFC infrastructure refers to the networking architecture and framework that enables the creation, deployment, and management of service chains within a network. Service function chaining is a technique used to define an ordered list of network services (such as firewalls, load balancers, and intrusion detection systems) through which traffic is systematically routed. This ordered list is known as a "chain," and each service in the chain is called a "service function." The SFC infrastructure is designed to ensure that network traffic flows through these service functions in a specified sequence, improving efficiency, security, and flexibility of network service delivery. An SFC infrastructure can include Service Function Forwarders, Service Functions (SFs), Service Function Paths (SFPs), etc. SFFs are the network devices responsible for forwarding traffic to the desired service functions according to the defined service chains. SFFs ensure that packets are directed through the correct sequence of service functions. SFs are the actual network services that process the packets. These can be physical or virtual network functions, such as firewalls, wide area network (WAN) optimizers, load balancers, intrusion detection/prevention systems, or the like. An SFP is the defined path that traffic takes through the network, including the specific sequence of service functions it passes through. SFPs are established based on policy rules and can be dynamically adjusted to respond to changing network conditions or demands. The SFC infrastructure can use one or more SFC descriptors, which are policies or templates that describe the service chain, including the sequence of service functions, performance requirements, and other relevant metadata. The SFC descriptor(s) can serve as a blueprint for the instantiation and management of service chains within the network. The SFC infrastructure can include a classification function that is responsible for the initial inspection and classification of incoming packets to determine the appropriate service chain to which the traffic should be steered. Classification can be based on various packet attributes, such as source and destination IP addresses, port numbers, and application identifiers. Often part of a larger software-defined networking (SDN) or NFV framework, one or more network controllers can manage the SFC infrastructure. They can be responsible for orchestrating and deploying service chains, configuring network elements, and ensuring the real-time adjustment and optimization of traffic flows. The SFC infrastructure offers numerous benefits, including enhanced network agility, optimized resource utilization, and improved overall security. By decoupling the network's control plane from the data plane and leveraging virtualization technologies, SFC infrastructure can dynamically adjust to the network's changing needs, enabling more efficient and scalable service delivery models. As illustrated and described with respect to FIG. 2, the SFC infrastructure can be deployed as a DPU-based SFC infrastructure 200.

Figure 2:
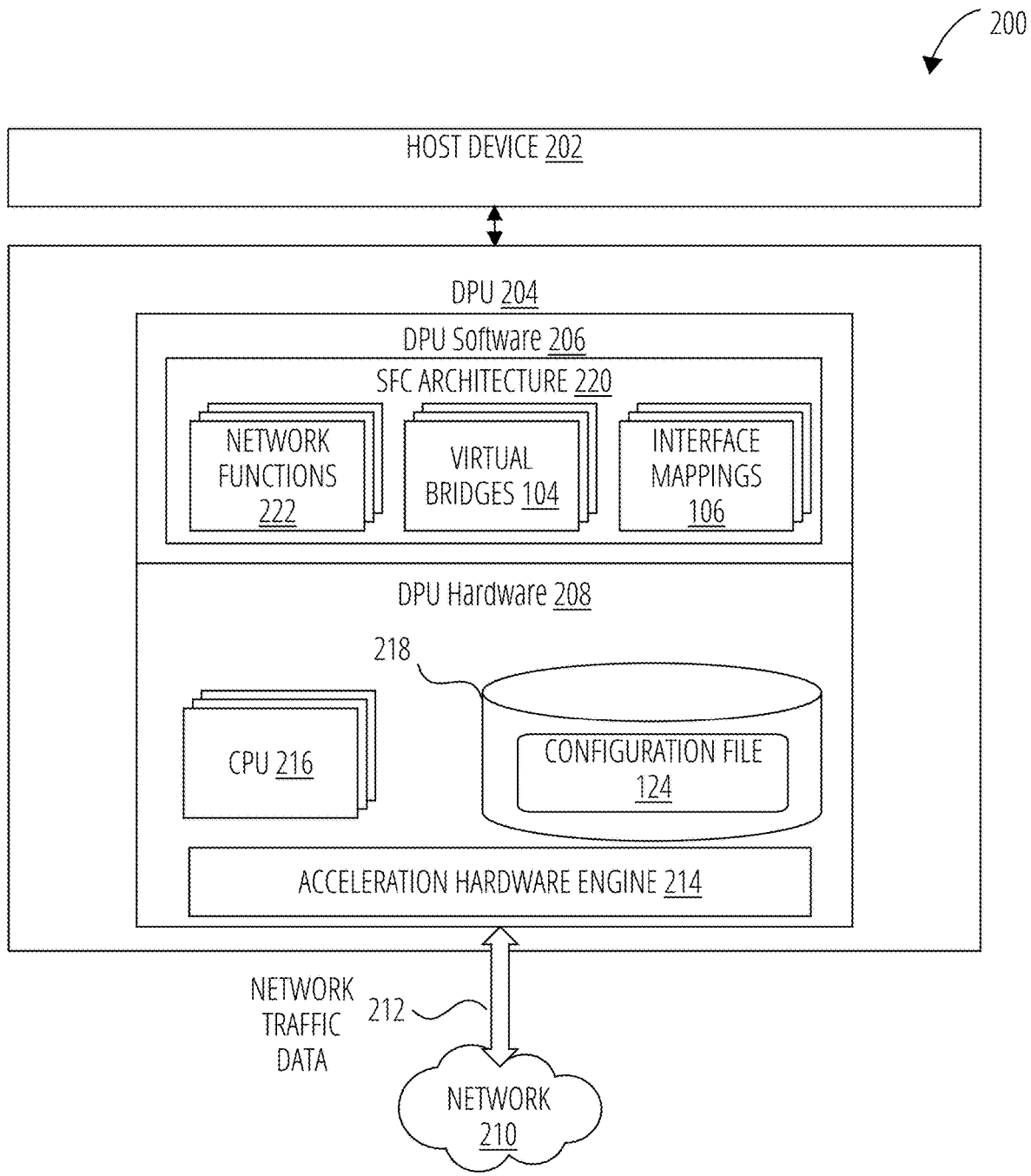
FIG. 2 is a block diagram of an example DPU-based Service Function Chaining (SFC) infrastructure for providing an SFC architecture according to at least one embodiment.

FIG. 2 is a block diagram of an example DPU-based SFC infrastructure 200 for providing an SFC architecture 220 according to at least one embodiment. The DPU-based SFC infrastructure 200 includes a DPU 204 coupled between a host device 202 and a network 210. In at least one embodiment, the DPU 204 is a System on a Chip (SoC) that is considered a data center infrastructure on a chip. The DPU 204 is a specialized processor designed to offload and accelerate networking, storage, and security tasks from the central processing unit (CPU) of the host device 202, thus enhancing overall system efficiency and performance. The DPU 204 can be used in data centers and cloud computing environments to manage data traffic more efficiently and securely.

The DPU 204 can include a network interconnect (e.g., one or more Ethernet ports) operatively coupled to the network 210. The network interconnect can be high-speed network interfaces that enable them to connect directly to the data center network infrastructure. These interfaces can support various speeds (e.g., 10 Gbps, 25 Gbps, 40 Gbps, or higher), depending on the model and deployment requirements. The network 210 may include a public network (e.g., the Internet), a private network (e.g., a local area network (LAN) or wide area network (WAN)), a wired network (e.g., Ethernet network), a wireless network (e.g., a 802.11 network or a Wi-Fi network), a cellular network (e.g., a Long Term Evolution (LTE) network), routers, hubs, switches, server computers, and/or a combination thereof.

The DPU 204 can be coupled to a CPU of the host device 202 (or multiple host devices or servers) via one or more host interconnects (e.g., Peripheral Component Interconnect Express (PCIe)). PCIe provides a high-speed connection between the DPU 204 and the host device's CPU, allowing for the fast transfer of data and instructions. This connection is used for offloading tasks from the CPU and for ensuring that the DPU 204 can access system memory and storage resources efficiently. To enable communication between the host device 202 and the DPU 204, specialized software drivers and firmware are installed on the host device 202. These software components allow the host's operating system and applications to interact with the DPU 204, offloading specific tasks to it and retrieving processed data. In virtualized environments, the DPU 204 can also interface with hypervisors or container management systems. This allows the DPU to support multiple virtual machines (VMs) or containers by providing them with virtualized network functions, network isolation, and security features without burdening the host device's CPU. The DPU 204 can utilize Direct Memory Access (DMA) to read from and write to the host device's memory directly, bypassing the CPU to reduce latency and free up CPU resources for other tasks. This enables efficient data movement between the host memory, the DPU 204, and the network 210. In at least one embodiment, the DPU 204 includes a direct memory access (DMA) controller (not illustrated in FIG. 2) coupled to a host interface. The DMA controller can read the data from the host's physical memory via a host interface. In at least one embodiment, the DMA controller reads data from the host's physical memory using the PCIe technology. Alternatively, other technologies can be used to read data from the host's physical memory. In other embodiments, the DPU 204 may be any computing system or computing device capable of performing the techniques described herein.

Once physically connected, the DPU 204 is configured to communicate with the network 210. This involves setting up IP addresses, VLAN tags (if using virtual networks), and routing information to ensure the DPU 204 can send and receive data packets to and from other devices on the network 210. As described herein, the DPU 204 executes network-related tasks, such as packet forwarding, encryption/decryption, load balancing, and quality of service (QOS) enforcement. By doing so, it effectively becomes an intelligent network interface controller with enhanced capabilities, capable of sophisticated data processing and traffic management.

In at least one embodiment, the DPU 204 includes DPU hardware 208 and DPU software 206 (e.g., software framework with acceleration libraries). The DPU hardware 208 can include one or more CPUs (e.g., a single-core or multi-core CPU), an acceleration hardware engine 214 (or multiple hardware accelerators), memory 218, and the network and host interconnects. In at least one embodiment, the DPU 204 includes DPU software 206, including software framework and acceleration libraries. The software framework and acceleration libraries can include one or more hardware-accelerated services, including a hardware-accelerated service (e.g., NVIDIA DOCA), hardware-accelerated virtualization services, hardware-accelerated networking services, hardware-accelerated storage services, hardware-accelerated artificial intelligence/machine learning (AI/ML) services, hardware-accelerated service, and hardware-accelerated management services.

In at least one embodiment, the memory 218 stores the configuration file 124. The 124 specifies the virtual bridges 104, the interface mappings 106 (host interfaces and network ports) between the virtual bridges 104, and the network functions 222 in the SFC architecture 220. For example, a CPU of the one or more CPU 216 can generate, according to the configuration file 124, a first virtual bridge and a second virtual bridge, the first virtual bridge to be controlled by a first network service hosted on the DPU 204 and the second virtual bridge to be controlled by a user-defined logic. The CPU can add, according to the configuration file, one or more host interfaces to the second virtual bridge, a first service interface to the first virtual bridge to operatively couple to the first network service, and one or more virtual ports between the first virtual bridge and the second virtual bridge. The SFC logic 102, as described above with respect to FIG. 1, can be implemented in the DPU software 206 to generate and manage the SFC architecture 220. The SFC logic 102 can leverage the acceleration hardware engine 214 (e.g., DPU hardware 208) to offload and filter network traffic data 212 based on predefined filters using the hardware capabilities of the acceleration hardware engine 214. The DPU hardware 208 can receive network traffic data 212 over the network ports from a second device (or multiple devices) on the network 210.

In at least one embodiment, the DPU software 206 can perform several actions when creating the virtual bridges 104 and the corresponding interface mappings 106 to ensure proper configuration and integration within the virtualized environment. The DPU software 206 can initialize the creation of a virtual bridge by allocating the resources and setting up the initial configuration parameters. These configurations can be stored in the configuration file 124. The configuration parameters can define the bridge name, network protocols to be supported, and any specific settings related to performance or security. A virtual network interface is created to act as the virtual bridge. This interface serves as the anchor point for all the virtual and physical interfaces that will be connected to the virtual bridge. The DPU software 206 can identify and link the designated physical (e.g., Ethernet ports) and virtual interfaces (e.g., virtual machine network adapters) to the newly created virtual bridge. This action involves configuring each interface's settings to ensure compatibility and optimal communication within the virtual bridge. The DPU software 206 can configure the networking protocols. Networking protocols and services, such as Spanning Tree Protocol (STP) for loop prevention, are configured on the virtual bridge. The DPU software 206 may also set up VLAN tagging for traffic segmentation, QoS policies for traffic prioritization, and security features like Access Control Lists (ACLs). The DPU software 206 can assign IP addresses to the bridge interfaces. If the virtual bridge acts as a layer 3 (L3) switch, the DPU software 206 assigns IP addresses to the bridge interface, enabling it to participate in IP routing between the different connected networks or devices. The DPU software 206 can provide a unified interface to allow for centralized control and monitoring of the network. Network administrators can manage the virtual bridge alongside other virtual network components through the unified interface. The DPU software 206 can enable monitoring and management features for the virtual bridge, allowing network administrators to observe traffic flow, identify potential issues, and make adjustments, as needed, to optimize network performance and security. Throughout these steps, the software ensures that the virtual bridge is seamlessly integrated into the existing network architecture, providing a flexible and efficient way to connect various network segments within virtualized environments.

In addition to generating the virtual bridges 104, the DPU software 206 can generate one or more virtual ports between the virtual bridges 104. A virtual port, often referred to as a patch port in the context of virtual networking, is a software-defined networking component that facilitates the connection and communication between different virtual devices or between virtual and physical devices within a network. Unlike physical ports on a network switch or router, virtual ports are not bound to a specific hardware interface; instead, they are created and managed through software, providing a flexible and efficient means to route traffic within virtualized environments. Virtual ports play a crucial role in creating complex network topologies within VMs, containers, and virtual networks. They can be used to configure virtual switches (vSwitches) or bridges, allowing virtual machines on the same host or across different hosts to communicate as if they were connected to the same physical network switch. Additionally, patch ports can connect virtual networks to physical networks, enabling VMs to access external network resources. The virtual ports can be dynamically created, configured, and deleted based on network requirements, making it easier to adapt to changes in the network topology or workload demands. By optimizing the use of underlying physical network infrastructure, virtual ports can help improve overall network efficiency, reducing the need for additional physical hardware. Virtual ports support advanced networking features like VLAN tagging, QoS settings, and ACL configurations, enabling precise management of network traffic. The virtual ports can also provide visibility into virtual network traffic, allowing for detailed monitoring, logging, and troubleshooting activities.

In addition to generating the virtual bridges 104, the DPU software 206 can configure link state propagation of the virtual bridges 104. Link propagation in the context of virtual bridges or virtual switches, such as Open vSwitch (OVS), refers to the process by which state changes in physical or virtual network interfaces are communicated across the network. This ensures that the entire network topology is aware of connectivity status and can adjust routing and switching behavior accordingly. Link propagation is used for maintaining the accuracy of the network's operational state, enabling efficient data flow, and ensuring high availability and reliability of network services. In OVS, OVS monitors the state of physical ports and virtual interfaces connected to it. This includes tracking when ports go up (become active) or down (become inactive) due to changes in the physical link status or virtual interface configuration. Upon detecting a change in the state of a port, OVS propagates this information throughout the network. This is done by sending notifications to relevant components within the network infrastructure, such as other switch instances, network controllers, or virtual machines connected to the virtual switch. Based on the propagated link state information, network devices and protocols can adjust their operation. This might involve recalculating routes, redistributing network traffic, or initiating failover procedures to alternative paths or interfaces to maintain network connectivity and performance. Link propagation helps maintain consistency across the network's view of the topology. By ensuring that all elements of the network have up-to-date information about link states, it enables coherent and coordinated network behavior, particularly in dynamic environments with frequent changes. OVS can integrate link propagation with standard network protocols and mechanisms, such as the Spanning Tree Protocol (STP) for loop prevention and the Link Layer Discovery Protocol (LLDP) for network discovery. This integration enhances the switch's ability to participate in a broader network ecosystem, conforming to and benefiting from established network management practices. Link propagation plays a foundational role in the adaptive and resilient behavior of networks utilizing virtual bridges or switches like OVS, ensuring that changes in the network infrastructure are quickly and accurately reflected across the entire network. This capability is especially important in virtualized and cloud environments, where the topology can be highly dynamic, and the efficiency and reliability of network connectivity are important.

In at least one embodiment, the DPU software 206 can configure link state propagation in a virtual bridge by setting up mechanisms to monitor and communicate the operational states of links (such as UP or DOWN) across the network. This allows the virtual bridge and its connected entities to dynamically adjust to changes in network topology, such as when interfaces are added, removed, or experience failures. The DPU software 206 can activate the monitoring capabilities on the virtual bridge for all connected interfaces, both physical and virtual. This typically includes enabling the detection of link status changes so that the bridge can identify when a port becomes active or inactive. Once monitoring is enabled, the system needs to be configured to notify the relevant components within the network about any changes. This might involve setting up event listeners or subscribers that can respond to notifications about link state changes. For virtual bridges managed by a controller (in SDN environments), this could also mean configuring the communication between the bridge and the controller to ensure it receives timely updates about the network state. Configuring link propagation also involves specifying the actions that should be triggered by changes in link states. For example, this could include automatically recalculating routing tables, redistributing traffic to available paths, or even triggering alerts and logging events for network administrators. The virtual bridge's forwarding database (FDB) or MAC table may need to be dynamically updated based on link state changes to ensure that traffic is efficiently routed within the network. This ensures that packets are not sent to interfaces that are down.

In at least one embodiment, the DPU software 206 can configure the virtual bridge to filter the network traffic data 212. For example, the configuration file 124 can specify what data should be extracted from the network traffic data 212 by the virtual bridge. The configuration file 124 can specify one or more filters that extract for inclusion or remove from inclusion specified types of data from the network traffic data 212. The network traffic that meets the filtering criteria can be structured and streamed to one of the network functions 222 for processing. For example, the configuration file 124 can specify that all HyperText Transport Protocol (HTTP) traffic be extracted from the network traffic data 212 and routed to one of the network functions 222. The configuration file 124 can specify that all traffic on specific ports should be extracted from the network traffic data 212 for processing by the network functions 222, which are described in more detail below.

As described herein, the SFC architecture 220 can provide support for different network protocols and capabilities in network functions 222. Different network protocols and capabilities serve as the backbone of modern networking, enabling a wide array of functionalities from basic connectivity to advanced security and traffic optimization. The network functions 222 can include network functions, including a set of tables and logic to perform the corresponding network function, such as ACL, ECMP routing, tunneling, Connection Tracking (CT), NAT, QOS, or the like. ACLs are a fundamental network security feature that allows or denies traffic based on a set of rules. These lists are applied to network interfaces, controlling the flow of packets either at the ingress or egress point. The rules can specify various parameters such as source and destination IP addresses, port numbers, and the protocol type to finely tune the traffic filtering process, enhancing security and compliance. ECMP is a routing strategy used to distribute outgoing network traffic across multiple paths that have the same cost. By balancing the load evenly across these paths, ECMP can significantly increase the bandwidth and reliability of the network. This protocol is particularly useful in data center and cloud environments, where high availability and scalability are important. Tunneling encapsulates one protocol or session inside another protocol, allowing data to traverse networks with incompatible address spaces or architectures. It is widely used in implementing Virtual Private Networks (VPNs), where secure tunnels over the internet enable private communications. Protocols like IPsec and GRE are common examples that facilitate tunneling for security and protocol encapsulation purposes. CT refers to the ability of a network device (such as a firewall or a router) to maintain the state information of network connections passing through it. This capability enables the device to make more informed decisions about which packets to allow or block, based on the context of the session to which they belong. CT is crucial for implementing stateful firewalls and NAT (Network Address Translation) functionalities. QoS capabilities refers to mechanisms that prioritize certain types of traffic to ensure the performance of applications, especially in congested network scenarios. The network functions 222 can include other types of network functions, such as Segment Routing (SR), Multiprotocol Label Switching (MPLS), Network Virtualization, Software-Defined Networking (SDN), or the like. SR enables the source of a packet to define the path that the packet takes through the network using a list of segments, improving the efficiency and flexibility of routing. MPLS is a method for speeding up and shaping network traffic flows, where data packets are labeled and quickly routed through pre-determined paths in the network. Network Virtualization involves abstracting physical network equipment and resources into a virtual network, allowing for more flexible and efficient resource management. Software-Defined Networking (SDN) decouples the network control and forwarding functions, enabling programmable network management and the efficient orchestration of network services. These protocols and capabilities represent just a fraction of the vast array of technologies that underlie modern networking, each playing a specific role in ensuring that data is transported efficiently, securely, and reliably across the digital infrastructure.

The integration of a DPU 204 into the network 210 and the host device 202 thus represents a powerful approach to optimizing data processing tasks, significantly enhancing the performance, and security of data center and cloud computing environments. By handling a substantial portion of the networking, storage, and security workload, the DPU 204 can enable CPUs to focus more on application processing, improving overall system efficiency and throughput. For example, the DPU 204 can handle network data path processing of network traffic data 212. The CPU can control path initialization and exception processing. The DPU 204 can be part of a data center and include one or more data stores, one or more server machines, and other components of data center infrastructure. It should be noted that, unlike a CPU or a GPU, the DPU 204 is a new class of programmable processor that combines three key elements, including, for example: 1) an industry-standard, high-performance, software-programmable CPU (single-core or multi-core CPU), tightly coupled to the other SoC components; 2) a high-performance network interface capable of parsing, processing and efficiently transferring data at line rate, or the speed of the rest of the network, to GPUs and CPUs; and 3) a rich set of flexible and programmable acceleration engines that offload and improve applications performance for AI and machine learning, security, telecommunications, and storage, among others. These capabilities can enable an isolated, bare-metal, cloud-native computing platform for cloud-scale computing. In at least one embodiment, DPU 204 can be used as a stand-alone embedded processor. In at least one embodiment, DPU 204 can be incorporated into a network interface controller (also called a Smart Network Interface Card (SmartNIC)) used as a server system component. A DPU-based network interface card (network adapter) can offload processing tasks that the server system's CPU normally handles. Using its processor, a DPU-based SmartNIC may be able to perform any combination of encryption/decryption, firewall, transport control protocol/Internet Protocol (TCP/IP), and HyperText Transport Protocol (HTTP) processing. SmartNICs can be used for high-traffic web servers, for example.

In at least one embodiment, DPU 204 can be configured for traditional enterprises' modern cloud workloads and high-performance computing. In at least one embodiment, DPU 204 can deliver a set of software-defined networking, storage, security, and management services at a data-center scale with the ability to offload, accelerate, and isolate data center infrastructure. In at least one embodiment, DPU 204 can provide multi-tenant, cloud-native environments with these software services. In at least one embodiment, DPU 204 can deliver data center services of up to hundreds of CPU cores, freeing up valuable CPU cycles to run business-critical applications. In at least one embodiment, DPU 204 can be considered a new type of processor that is designed to process data center infrastructure software to offload and accelerate the compute load of virtualization, networking, storage, security, cloud-native AI/ML services, and other management services.

In at least one embodiment, the DPU 204 can include connectivity with packet-based interconnects (e.g., Ethernet), switched-fabric interconnects (e.g., InfiniBand, Fibre Channels, Omni-Path), or the like. In at least one embodiment, DPU 204 can provide a data center that is accelerated, fully programmable, and configured with security (e.g., zero-trust security) to prevent data breaches and cyberattacks. In at least one embodiment, the DPU 204 can include a network adapter, an array of processor cores, and infrastructure offload engines with full software programmability. In at least one embodiment, the DPU 204 can sit at an edge of a server to provide flexible, secured, high-performance cloud and AI workloads. In at least one embodiment, the DPU 204 can reduce the total cost of ownership and increase data center efficiency. In at least one embodiment, the DPU 204 can provide the software framework and acceleration libraries (e.g., NVIDIA DOCA™) that enable developers to rapidly create applications and services for the DPU 204, such as security services, virtualization services, networking services, storage services, AI/ML services, and management services. In at least one embodiment, the software framework and acceleration libraries make it easy to leverage hardware accelerators of the DPU 204 to provide data center performance, efficiency, and security. In at least one embodiment, the DPU 204 can be coupled to a GPU. The GPU can include one or more accelerated AI/ML pipelines.

In at least one embodiment, the DPU 204 can provide networking services with a virtual switch (vSwitch), a virtual router (vRouter), network address translation (NAT), load balancing, and network virtualization (NFV). In at least one embodiment, the DPU 204 can provide storage services, including NVME™ over fabrics (NVMe-oF™) technology, elastic storage virtualization, hyper-converged infrastructure (HCI) encryption, data integrity, compression, data deduplication, or the like. NVM Express™ is an open logical device interface specification for accessing non-volatile storage media attached via the Peripheral Component Interconnect Express® (PCIe) interface. NVMe-oF™ provides an efficient mapping of NVMe commands to several network transport protocols, enabling one computer (an "initiator") to access block-level storage devices attached to another computer (a "target") very efficiently and with minimum latency. The term "Fabric" is a generalization of the more specific ideas of network and input/output (I/O) channel. It essentially refers to an N: M interconnection of elements, often in a peripheral context. The NVMe-oF™ technology enables the transport of the NVMe command set over a variety of interconnection infrastructures, including networks (e.g., Internet Protocol (IP)/Ethernet) and I/O Channels (e.g., Fibre Channel). In at least one embodiment, the DPU 204 can provide hardware-accelerated services using Next-Generation Firewall (NGFW), Intrusion Detection Systems (IDS), Intrusion Prevention System (IPS), a root of trust, micro-segmentation, distributed denial-of-service (DDoS) prevention technologies, and ML detection. NGFW is a network security device that provides capabilities beyond a stateful firewall, like application awareness and control, integrated intrusion prevention, and cloud-delivered threat intelligence. In at least one embodiment, one or more network interfaces can include an Ethernet interface (single or dual ports) and an InfiniBand interface (single or dual ports). In at least one embodiment, the one or more host interfaces can include a PCIe interface and a PCIe switch. In at least one embodiment, the one or more host interfaces can include other memory interfaces. In at least one embodiment, the CPU can include multiple cores (e.g., up to 8 64-bit core pipelines) with L2 cache per two one or two cores and L3 cache with eviction policies support for double data rate (DDR) dual in-line memory module (DIMM) (e.g., Double Data Rate 4 (DDR4) DIMM support), and a DDR4 Dynamic Random Access Memory (DRAM) controller. Memory can be on-board DDR4 memory with error correction code (ECC) error protection support. In at least one embodiment, the CPU can include a single core with L2 and L3 caches and a DRAM controller. In at least one embodiment, the one or more hardware accelerators can include a security accelerator, a storage accelerator, and a networking accelerator. In at least one embodiment, the security accelerator can provide a secure boot with hardware root-of-trust, secure firmware updates, Cerberus compliance, Regular expression (RegEx) acceleration, IP security (IPsec)/Transport Layer Security (TLS) data-in-motion encryption, Advanced Encryption Standard Galois/Counter Mode (AES-GCM) 512/256-bit key for data-at-rest encryption (e.g., AES with ciphertext stealing (XTS) (e.g., AES-XTS 256/512), secure hash algorithm (SHA) 256-bit hardware acceleration, Hardware public key accelerator (e.g., Rivest-Shamir-Adleman (RSA), Diffie-Hellman, Digital Signal Algorithm (DSA), ECC, Elliptic Curve Cryptography Digital Signal Algorithm (ECC-DSA), Elliptic-curve Diffie-Hellman (EC-DH)), and True random number generator (TRNG). In at least one embodiment, the storage accelerator can provide BlueField SNAP-NVMe™ and VirtIO-blk, NVMc-OF™ acceleration, compression and decompression acceleration, and data hashing and deduplication. In at least one embodiment, the network accelerator can provide remote direct memory access (RDMA) over Converged Ethernet (ROCE) ROCE, Zero Touch ROCE, Stateless offloads for TCP, IP, and User Datagram Protocol (UDP), Large Receive Offload (LRO), Large Segment Offload (LSO), checksum, Total Sum of Squares (TSS), Residual Sum of Squares (RSS), HTTP dynamic streaming (HDS), and virtual local area network (VLAN) insertion/stripping, single root I/O virtualization (SR-IOV), virtual Ethernet card (e.g., VirtIO-net), Multi-function per port, VMware NetQueue support, Virtualization hierarchies, and ingress and egress Quality of Service (QOS) levels (e.g., 1K ingress and egress QoS levels). In at least one embodiment, the DPU 204 can also provide boot options, including secure boot (RSA authenticated), remote boot over Ethernet, remote boot over Internet Small Computer System Interface (ISCSI), Preboot execution environment (PXE), and Unified Extensible Firmware Interface (UEFI).

In at least one embodiment, the DPU 204 can provide management services, including a 1 GbE out-of-band management port, network controller sideband interface (NC-SI), Management Component Transport Protocol (MCTP) over System Management Bus (SMBus), and Monitoring Control Table (MCT) over PCIe, Platform Level Data Model (PLDM) for Monitor and Control, PLDM for Firmware Updates, Inter-Integrated Circuit (I2C) interface for device control and configuration, Serial Peripheral Interface (SPI) interface to flash, embedded multi-media card (cMMC) memory controller, Universal Asynchronous Receiver/Transmitter (UART), and Universal Serial Bus (USB).

The host device 202 may be a desktop computer, a laptop computer, a smartphone, a tablet computer, a server, or any suitable computing device capable of performing the techniques described herein. In some embodiments, the host device 202 may be a computing device of a cloud-computing platform. For example, the host device 202 may be a server machine of a cloud-computing platform or a component of the server machine. In such embodiments, the host device 202 may be coupled to one or more edge devices (not shown) via the network 210. An edge device refers to a computing device that enables communication between computing devices at the boundary of two networks. For example, an edge device may be connected to host device 202, one or more data stores, one or more server machines via network 210, and may be connected to one or more endpoint devices (not shown) via another network. In such an example, the edge device can enable communication between the host device 202, one or more data stores, one or more server machines, and one or more client devices. In other or similar embodiments, host device 202 may be an edge device or a component of an edge device. For example, host device 202 may facilitate communication between one or more data stores, one or more server machines connected to host device 202 via network 210, and one or more client devices connected to host device 202 via another network.

In still other or similar embodiments, the host device 202 can be an endpoint device or a component of an endpoint device. For example, host device 202 may be, or may be a component of, devices, such as televisions, smartphones, cellular telephones, data center servers, data DPUs, personal digital assistants (PDAs), portable media players, netbooks, laptop computers, electronic book readers, tablet computers, desktop computers, set-top boxes, gaming consoles, a computing device for autonomous vehicles, a surveillance device, and the like. In such embodiments, host device 202 may be connected to the DPU 204 over one or more network interfaces via network 210. In other or similar embodiments, host device 202 may be connected to an edge device (not shown) via another network, and the edge device may be connected to the DPU 204 via network 210.

In at least one embodiment, the host device 202 executes one or more computer programs. One or more computer programs can be any process, routine, or code executed by the host device 202, such as a host OS, an application, a guest OS of a virtual machine, or a guest application, such as executed in a container. host device 202 can include one or more CPUs of one or more cores, one or more multi-core CPUs, one or more GPUs, one or more hardware accelerators, or the like.

As described above, the DPU 204 can generate and configure the SFC architecture 220 of network functions 222 with configurable and dynamic SFC interface mappings of multiple virtual bridges 104. Examples of the SFC architectures are illustrated and described below with respect to FIG. 3, FIG. 4, and FIG. 5.

Figure 3:
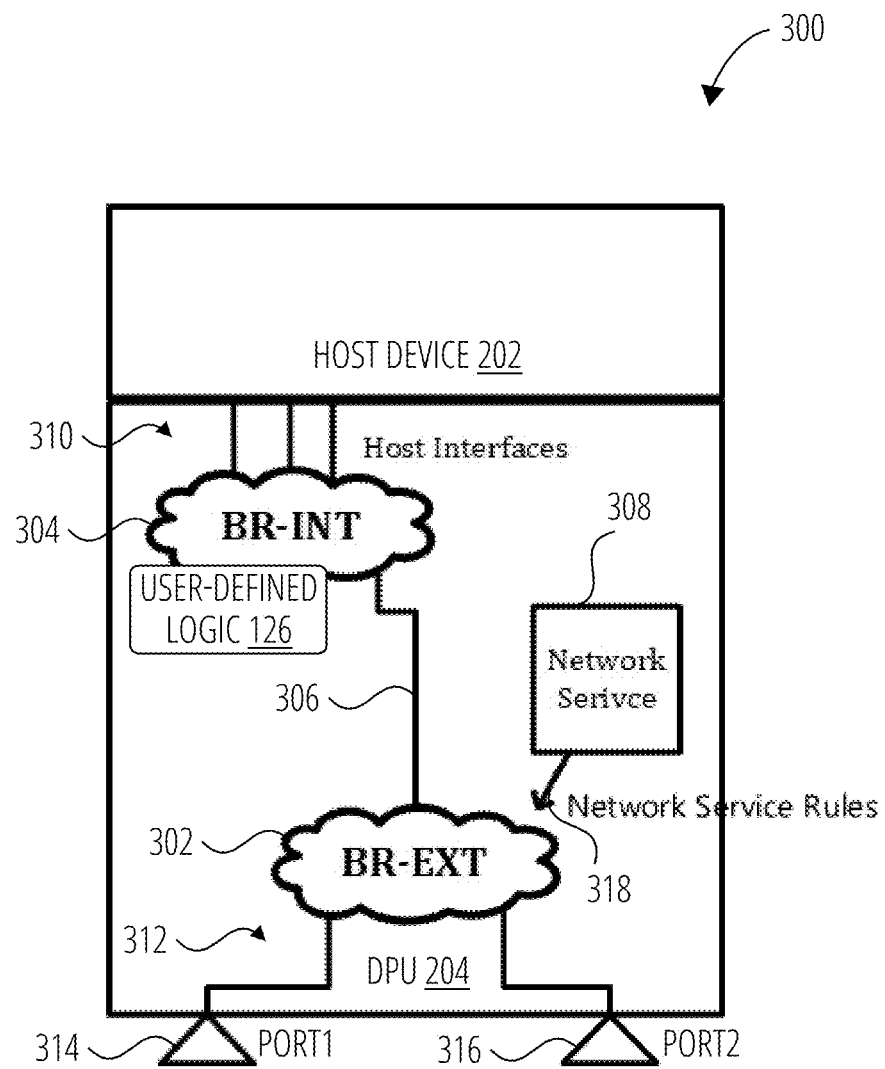
FIG. 3 is a block diagram of an SFC architecture with a first virtual bridge, a second virtual bridge, a virtual port, and a network service, according to at least one embodiment.

FIG. 3 is a block diagram of an SFC architecture 300 with a first virtual bridge 302 (labeled "BR-EXT" for external bridge), a second virtual bridge 304 (labeled "BR-INT" for internal bridge), a virtual port 306, and a network service 308, according to at least one embodiment. As described herein, the SFC logic 102 can generate the first virtual bridge 302, the second virtual bridge 304, and the virtual port 306 in the SFC architecture 300. The SFC logic 102 can configure the first virtual bridge 302 to be controlled by the network service 308 hosted on the DPU 204 and the second virtual bridge 304 to be controlled by the user-defined logic 126. The SFC logic 102 adds a service interface to the first virtual bridge 302 to operatively couple the network service 308 to the first virtual bridge 302. The SFC logic 102 adds the virtual port 306 between the first virtual bridge 302 and second virtual bridge 304. The network service 308 can provide one or more network service rules 318 to the first virtual bridge 302. The SFC logic 102 can add one or more host interfaces 310 to the second virtual bridge 304.

As illustrated, three separate host interfaces can be added to connect the second virtual bridge 304 to hosts, such as three separate VMs hosted on the host device 202. For example, one VM can host a firewall application, another VM can host a load balancer application, and another VM can host an IDS application. The SFC logic 102 can add one or more network interfaces 312 to the first virtual bridge 302. In particular, the SFC logic 102 can add, to the first virtual bridge 302, a first network interface to operatively couple to a first network port 314 (labeled PORT1) of the DPU 204, and a second network interface to operatively couple to a second network port 316 (labeled PORT2) of the DPU 204. The first virtual bridge 302 can receive network traffic data from the first network port 314 and the second network port 316. The first virtual bridge 302 can receive network traffic data from the first network port 314 and the second network port 316. The first virtual bridge 302 can direct the network traffic data to the second virtual bridge 304 via the virtual port 306. The second virtual bridge 304 can direct the network traffic data to the corresponding host via the host interfaces 310.

In at least one embodiment, the user-defined logic 126 is part of the second virtual bridge 304. In at least one embodiment, the user-defined logic 126 is part of a user-defined service hosted on the DPU 204, such as a user-defined network service, a user-defined security service, a user-defined telemetry service, a user-defined storage service, or the like. The SFC logic 102 can add another service interface to the second virtual bridge 304 to operatively couple the user-defined service to the second virtual bridge 304.

In at least one embodiment, the SFC logic 102 can configure, in the second virtual bridge 304, a first link state propagation between a first host interface and the virtual port 306, and a second link state propagation between a second host interface and the virtual port 306. Similarly, the SFC logic 102 can configure, in the second virtual bridge 304, a third link state propagation between a third host interface and the virtual port 306. Similar link state propagations can be configured in the first virtual bridge 302 for links between the virtual port 306 and the network interfaces 312.

In at least one embodiment, the SFC logic 102 can configure an operating system (OS) property in the second virtual bridge 304. In at least one embodiment, the SFC logic 102 can configure an OS property for each of the host interfaces 310.

As described herein, the SFC architecture 300 can be created as part of installation of the OS on the DPU 204 or as part of runtime of the DPU 204. This can be done using a second configuration file or a modification to the original configuration file. The re-configuration of the DPU as part of runtime can be done without reinstallation of the OS on the DPU 204.

Figure 4:
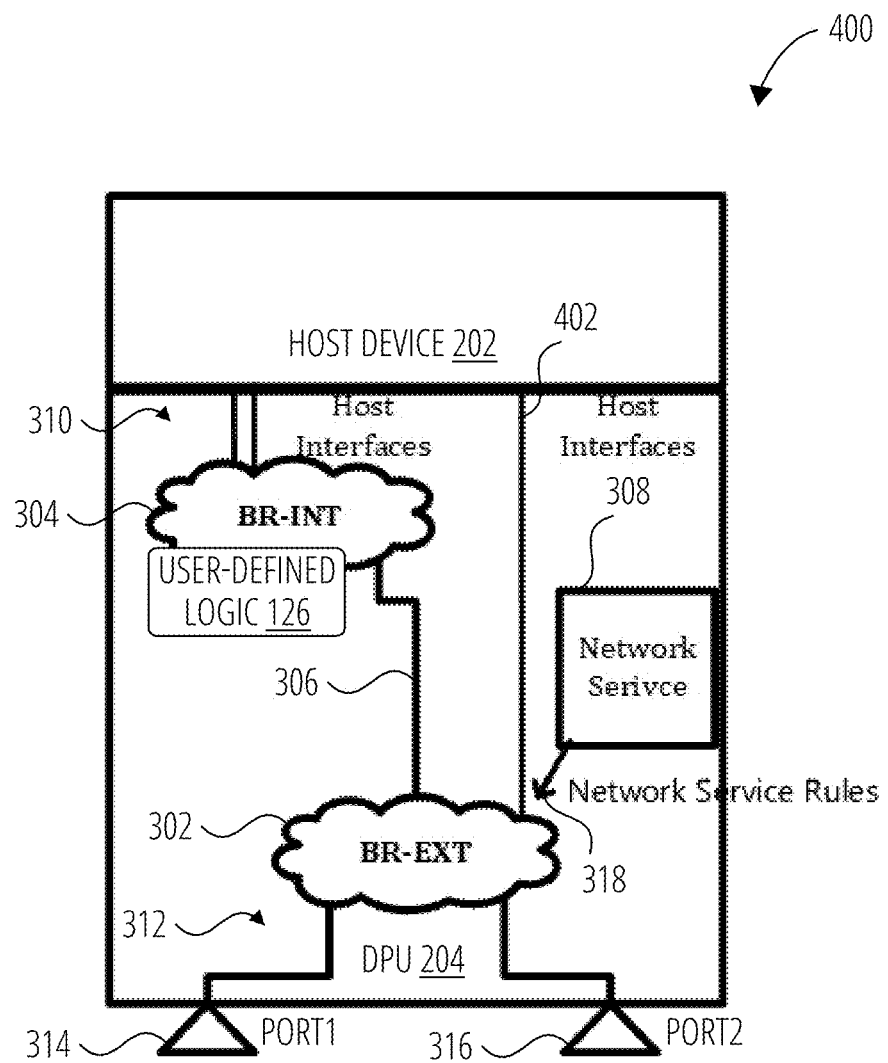
FIG. 4 is a block diagram of an SFC architecture with a first virtual bridge, a second virtual bridge, a virtual port, and a network service, according to at least one embodiment.

It should be noted that the SFC logic 102 can generate different combinations of virtual bridges and interface mappings in different SFC architectures, such as illustrated in FIG. 4.

FIG. 4 is a block diagram of an SFC architecture 400 with a first virtual bridge 302, a second virtual bridge 304, a virtual port 306, and a network service 308, according to at least one embodiment. The SFC architecture 400 is similar to SFC architecture 300 as noted by similar reference numbers, except the SFC architecture 400 includes additional host interfaces 402 as described in more detail below.

As described above, the SFC logic 102 can generate the first virtual bridge 302, the second virtual bridge 304, and the virtual port 306 in the SFC architecture 400. The SFC logic 102 can configure the first virtual bridge 302 to be controlled by the network service 308 hosted on the DPU 204 and the second virtual bridge 304 to be controlled by the user-defined logic 126 (on the second virtual bridge 304 or on a user-defined service as described above). The SFC logic 102 adds a service interface to the first virtual bridge 302 to operatively couple the network service 308 to the first virtual bridge 302. The SFC logic 102 adds the virtual port 306 between the first virtual bridge 302 and second virtual bridge 304. The network service 308 can provide one or more network service rules 318 to the first virtual bridge 302. The SFC logic 102 can add one or more host interfaces 310 to the second virtual bridge 304 and one or more host interfaces 402 to the first virtual bridge 302.

As illustrated, two separate host interfaces can be added to connect the second virtual bridge 304 to one or more hosts (e.g., VMs or containers hosted on the host device 202), and one host interface can be added to connect the first virtual bridge 302 to a host (e.g., a VM or container hosted on the host device 202). In other embodiments, different number of host interfaces can be added to multiple virtual bridges according to the configuration file 124. The SFC logic 102 can add one or more network interfaces 312 to the first virtual bridge 302. In particular, the SFC logic 102 can add, to the first virtual bridge 302, a first network interface to operatively couple to a first network port 314 (labeled PORT1) of the DPU 204, and a second network interface to operatively couple to a second network port 316 (labeled PORT2) of the DPU 204. The first virtual bridge 302 can receive network traffic data from the first network port 314 and the second network port 316.

In at least one embodiment, the SFC logic 102 can configure, in the second virtual bridge 304, a first link state propagation between a first host interface and the virtual port 306, and a second link state propagation between a second host interface and the virtual port 306. Similarly, the SFC logic 102 can configure, in the first virtual bridge 302, a third link state propagation between a third host interface and the network interfaces 312. Similar link state propagations can be configured in the first virtual bridge 302 for links between the virtual port 306 and the network interfaces 312.

In at least one embodiment, the SFC logic 102 can configure an operating system (OS) property in the second virtual bridge 304. In at least one embodiment, the SFC logic 102 can configure an OS property for each of the host interfaces 310, as well as an OS property for each of the host interfaces 402.

In at least one embodiment, the DPU 204 can support configurable and dynamic interfaces mapping on the DPU 204 based on SFC infrastructure. The configuration can be supported as part of DPU OS installation and dynamically for DPU in production. The interface configuration can support different use-cases for network acceleration on the DPU 204. As described above, the SFC architecture can be composed of two main bridges: an external virtual bridge (BR-EXT), controlled by a networking service running on the DPU 204; and an internal virtual bridge (BR-INT), controlled by a user controller (e.g., OVN controller as described below with respect to FIG. 9). The interface configuration can support different requirements based on customers' use cases. For example, the interface configuration can support uplink interfaces to external virtual bridge (BR-EXT) or internal virtual bridge (BR-INT), host interfaces to the external or internal virtual bridges, as well as additional services connected to the internal virtual bridge (BR-INT), for example, security services, telemetry services, or the like. The interface configuration can support Scalable Functions (SFs) configurations. The interface configuration can support link propagation and different OS attributes (e.g., HUGEPAGE_SIZE, HUGEPAGE_COUNT, etc.).

The following is an example configuration file.
ENABLE_EX_VB=yes
enable external virtual bridge-Default is no
ENABLE_INT_VB=yes
enable internal virtual bridge-Default is no
EX_VB_UPLINKS="port1,port2"
Optional, define uplinks-default is "port1,port2"
INT_VB_UPLINKS=""
Uplink ports can be attached to one VB only
INT_VB_REPS="hostIF0, hostIF1, hostIF2"
EXT_VB_REPS="hostIF3, hostIF4"
Host interfaces are attached to the first or second virtual bridge per configuration.
Each host interface is attached to either the first or the second virtual bridge only.
INT_VB_SFS="service1"
EXT_VB_SFS="service2"
Connect service interface on the first or second virtual bridge.
EXT_INT_VB_VPORTS= "vport0", "vport1"
Creates patch ports and sets them as peers on the first or second virtual bridge.
LINK_PROPAGATION_1= "hostIF0: vport0", "hostIF1: vport1"
LINK_PROPAGATION_2= "hostIF2: vport1", "hostIF3: vport2"

```
#Link propagation between different interfaces
HUGEPAGE_SIZE=2048
#Optional, in kilobytes (KBs)
HUGEPAGE_COUNT=4096
#Optional, numeric
```

As described herein, the SFC architecture 400 can be created as part of installation of the OS on the DPU 204 or as part of runtime of the DPU 204. This can be done using a second configuration file or a modification to the original configuration file. The re-configuration of the DPU as part of runtime can be done without reinstallation of the OS on the DPU 204.

It should be noted that the SFC logic 102 can generate different combinations of virtual bridges and interface mappings in different SFC architectures, such as those illustrated in FIG. 3 and FIG. 4. For comparison, FIG. 5 illustrates a non-SFC architecture 500 that only allows one network service to control a single virtual bridge between hosts and the network.

Figure 5:
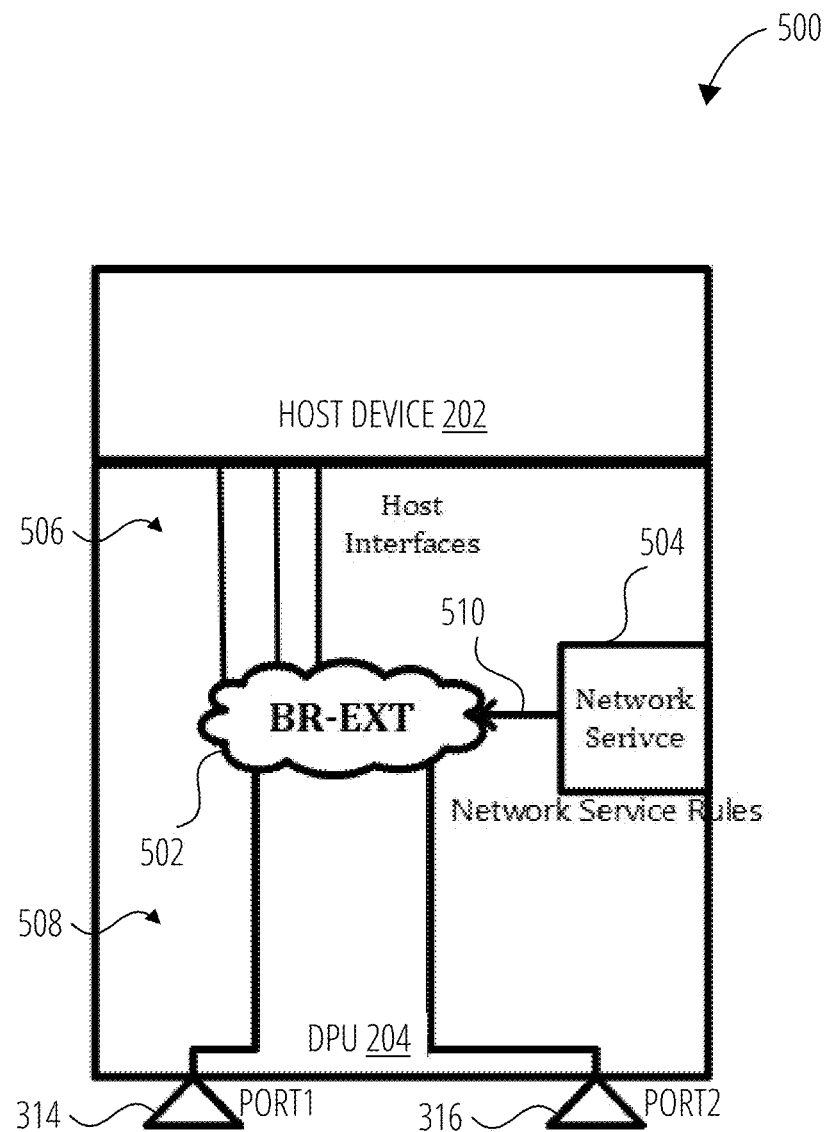
FIG. 5 is a block diagram of a non-SFC architecture with a first virtual bridge and a network service, according to at least one embodiment.

FIG. 5 is a block diagram of a non-SFC architecture 500 with a single virtual bridge 502 and a single network service 504, according to at least one embodiment. The single virtual bridge 502 can include multiple host interfaces 506, a service interface operatively coupled to the single network service 504, and two network interfaces 508. The single virtual bridge 502 is controlled by the single network service 504 using one or more network service rules 510. The network service 308 can provide one or more network service rules 318 over the service interface to configure the first virtual bridge 302. The single virtual bridge 502 can route network traffic data between the host device 202 (e.g., multiple VMs) and the first network port 314 and the second network port 316 of the DPU 204. The single virtual bridge 502 and the single network service 504 are limited in providing additional network functions beyond those provided by the single network service 504.

Figure 6:
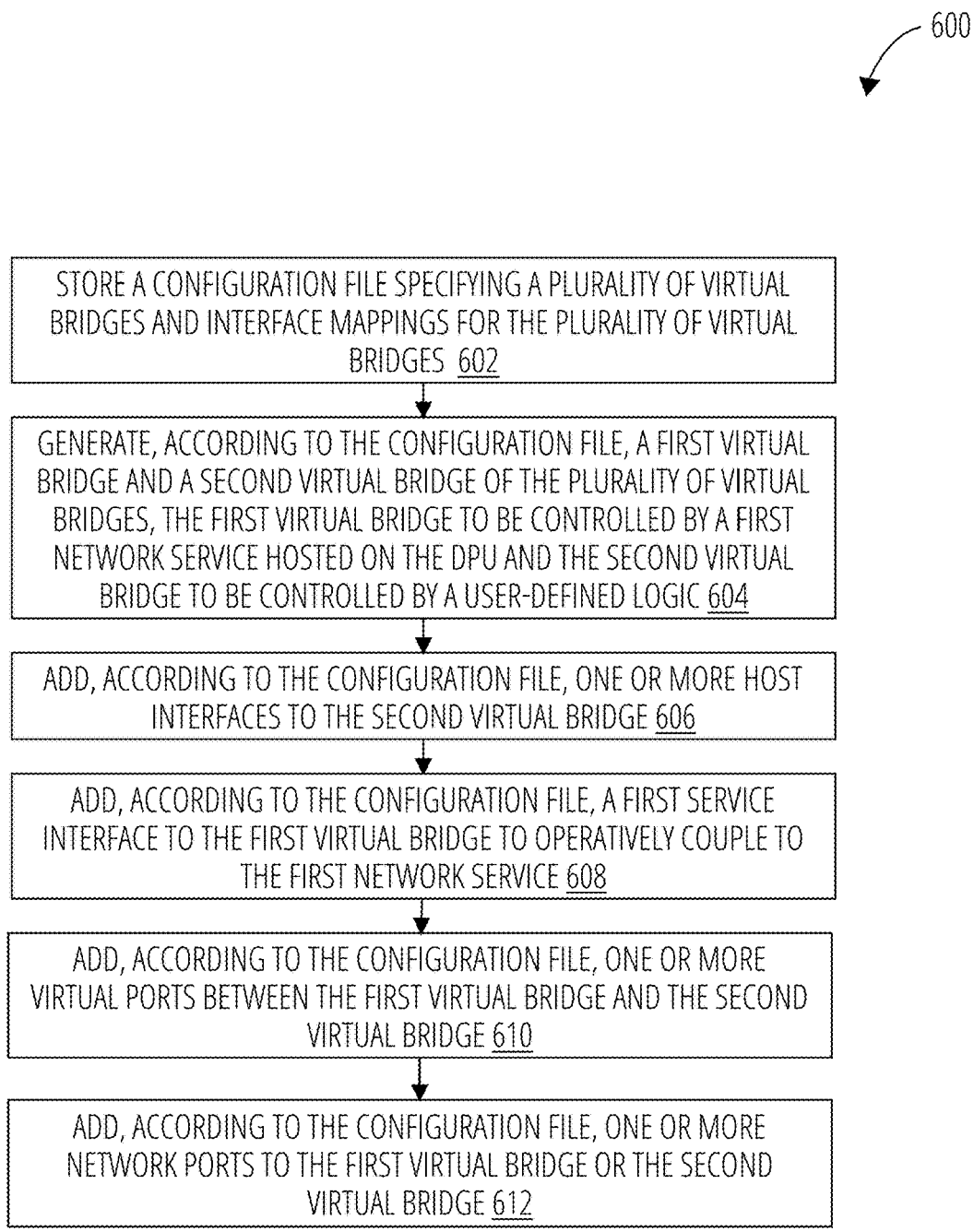
FIG. 6 is a flow diagram of an example method of configuring an SFC architecture with multiple virtual bridges and interface mappings according to at least one embodiment.

FIG. 6 is a flow diagram of an example method 600 of configuring an SFC architecture with multiple virtual bridges and interface mappings, according to at least one embodiment. The processing logic can be a combination of hardware, firmware, software, or any combination thereof. In at least one embodiment, the processing logic is implemented in a DPU, a switch, a network device, a GPU, a NIC, a CPU, or the like. In at least one embodiment, the processing logic is implemented in an acceleration hardware engine coupled to a switch. In at least one embodiment, method 600 may be performed by multiple processing threads, each thread executing one or more individual functions, routines, subroutines, or operations of the method. In at least one embodiment, processing threads implementing method 600 may be synchronized (e.g., using semaphores, critical sections, and/or other thread synchronization logic). Alternatively, processing threads implementing method 600 may be executed asynchronously with respect to each other. Various operations of method 600 may be performed differently than the order shown in FIG. 6. Some operations of the methods may be performed concurrently with other operations. In at least one embodiment, one or more operations shown in FIG. 6 may not always be performed.

Referring to FIG. 6, the method 600 begins with the processing logic storing a configuration file specifying a plurality of virtual bridges and interface mappings for the plurality of virtual bridges (block 602). At block 604, the processing logic generates, according to the configuration file, a first virtual bridge and a second virtual bridge of the plurality of virtual bridges, the first virtual bridge to be controlled by a first network service hosted on the DPU and the second virtual bridge to be controlled by a user-defined logic. At block 606, the processing logic adds, according to the configuration file, one or more host interfaces to the second virtual bridge. At block 608, the processing logic adds, according to the configuration file, a first service interface to the first virtual bridge to operatively couple to the first network service. At block 610, the processing logic adds, according to the configuration file, one or more virtual ports between the first virtual bridge and the second virtual bridge. At block 612, the processing logic adds, according to the configuration file, one or more network ports (uplink ports) to the first virtual bridge and/or the second virtual bridge.

In a further embodiment, the method 600 further includes the processing logic adding, according to the configuration file, a first network interface to the first virtual bridge to operatively couple to a first network port of the DPU, a second network interface to the first virtual bridge to operatively couple to a second network port of the DPU, a first host interface of the one or more host interfaces to the second virtual bridge to operatively couple to a host device, and adding, according to the configuration file, a second host interface of the one or more host interfaces to the second virtual bridge to operatively couple to the host device. The method 600 further includes the processing logic configuring, according to the configuration file, a first link state propagation in the second virtual bridge between the first host interface and the one or more virtual ports, and a second link state propagation in the second virtual bridge between the second host interface and the one or more virtual ports.

In a further embodiment, the method 600 further includes the processing logic adding, according to the configuration file, a first network interface to the first virtual bridge to operatively couple to a first network port of the DPU, a second network interface to the first virtual bridge to operatively couple to a second network port of the DPU, a first host interface of the one or more host interfaces to the second virtual bridge to operatively couple to a first host device, and a second host interface of the one or more host interfaces to the second virtual bridge to operatively couple to a second host device. The first host device is at least one of a virtual machine or a container, and the second host device is at least one of a virtual machine or a container. In a further embodiment, the method 600 further includes the processing logic configuring, according to the configuration file, a first link state propagation in the second virtual bridge between the first host interface and the one or more virtual ports, and a second link state propagation in the second virtual bridge between the second host interface and the one or more virtual ports.

In a further embodiment, the method 600 further includes the processing logic installing an OS to be executed on the processing device of the DPU. The processing logic generates the plurality of virtual bridges and the interface mappings of the plurality of virtual bridges as part of installing the OS on the DPU.

In a further embodiment, the method 600 further includes the processing logic installing an OS to be executed on the processing device of the DPU. The processing logic generates the plurality of virtual bridges and the interface mappings of the plurality of virtual bridges as part of runtime of the DPU and without reinstallation of the OS on the DPU.

Flexible Steering Rules in SFC Architectures

Steering rules are essential components in network and traffic management, dictating how data packets are directed through a network based on specific criteria. These rules can be applied in various contexts, including load balancing, security, compliance, and optimization of network resources. Below is a description of some common types of steering rules.

Source IP-based steering focuses on routing traffic based on the origin of the IP address, which can be pivotal for managing traffic from specific regions or known addresses, useful for localization, imposing geo-restrictions, or enhancing security. Destination IP-based steering, on the other hand, targets the intended end-point of the traffic, allowing networks to channel traffic to particular data centers or cloud regions based on the destination IP address.

Port-based steering uses TCP or UDP port numbers to direct specific types of traffic, such as HTTP or File Transfer Protocol (FTP), to resources best suited for handling them, thereby optimizing both performance and security. Application-aware steering goes deeper, inspecting packets to determine the application generating the traffic and routing different types of application traffic through paths optimized for their specific needs, such as low latency or high bandwidth.

Load-based steering directs traffic based on the current load or capacity of network paths, often in conjunction with load balancers, to distribute load evenly and prevent any resource from becoming a bottleneck. Time-based steering effectively manages network loads during different times of the day or week, routing traffic to alternate resources during peak periods to maintain performance.

Protocol-based steering makes routing decisions based on the specific protocols used, such as HTTP or HTTPS, ensuring that traffic is treated according to its particular requirements. Content or Data Type-based steering examines the content within the packets, directing types like video or text to processing services optimized for those data types, thus enhancing content delivery.

User Identity-based steering directs traffic based on the identity or role of the user, allowing networks to provide differentiated services or enforce security policies tailored to specific user profiles.

Combinations of these steering rules can form a comprehensive approach to managing traffic in complex environments like data centers, cloud networks, and large enterprises, ensuring efficient resource utilization and maintaining robust performance and security standards across the network.

Prior solutions could not provide flexible steering rules in a single accelerated data plane on a DPU. Aspects and embodiments of the present disclosure can provide flexible steering rules in a single accelerated data plane on a DPU. Aspects and embodiments of the present disclosure can provide hardware-accelerated flexible steering rules over an SFC architecture, as described below with respect to FIG. 7 to FIG. 10.

Figure 7:
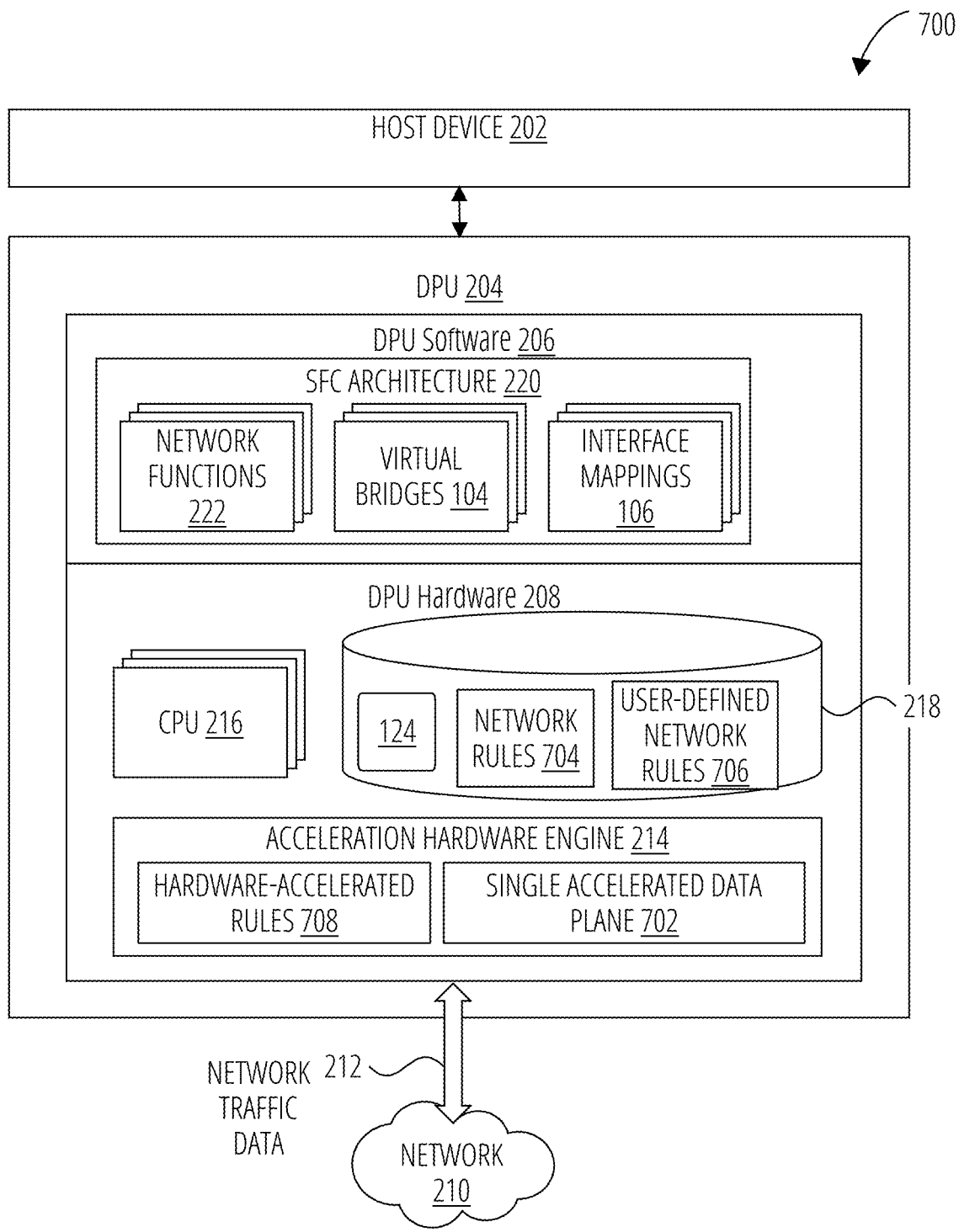
FIG. 7 is a block diagram of an example DPU-based SFC infrastructure for providing hardware-accelerated rules for an SFC architecture 220 according to at least one embodiment.

FIG. 7 is a block diagram of an example DPU-based SFC infrastructure 700 for providing hardware-accelerated rules for an SFC architecture 220 according to at least one embodiment. The DPU-based SFC infrastructure 700 is similar to DPU-based SFC infrastructure 200, as noted by similar reference numbers, except that the DPU-based SFC infrastructure 700 includes hardware-accelerated rules 708, which are derived from network rules from different sources in SFC architecture 220 and accelerated on the single accelerated data plane 702 of the acceleration hardware engine 214, as described in more detail below.

The acceleration hardware engine 214 can provide a single accelerated data plane 702 for the SFC architecture 220. The memory 218 can store the configuration file 124 specifying at least a first virtual bridge, a second virtual bridge, and a virtual port between the first virtual bridge and the second virtual bridge. The SFC logic 102 can generate, according to the configuration file 124, the first virtual bridge to be controlled by a first network service hosted on the DPU 204 and having a first set of one or more network rules 704. The first set of one or more network rules 704 can include a layer 2 (L2) protocol rule, a layer 3 (L3) protocol rule, a tunneling protocol rule, an Access Control List (ACL) rule, an Equal-Cost Multi-Path (ECMP) rule, a tunneling encapsulation rule, a tunneling decapsulation rule, a Connection Tracking (CT) rule, a virtual local area network (VLAN) rule, a network address translation (NAT) rule, or the like.

The SFC logic 102 can generate, according to the configuration file 124, the second virtual bridge having a second set of one or more user-defined network rules 706. In at least one embodiment, the user-defined network rules 706 are programmable by a user or a controller. The user-defined network rules 706 can include an L2 protocol rule, an L3 protocol rule, a tunneling protocol rule, an ACL rule, an ECMP rule, a tunneling encapsulation rule, a tunneling decapsulation rule, a CT rule, a VLAN rule, a NAT rule, or the like. In at least one embodiment, the network rules 704 can include a first set of steering rules for the first virtual bridge and the user-defined network rules 706 can include a second set of steering rules for the second virtual bridge. The steering rules can be application-based steering rules, policy-based steering rules, geolocation-based steering rules, load balancing rules, QoS rules, failover rules, redundancy rules, security-based steering rules, cost-based routing rules, software-defined wide area network (SD-WAN) path steering rules, software-defined networking (SDN) rules, or the like.

The SFC logic 102 can add, according to the configuration file 124, the virtual port between the first virtual bridge and the second virtual bridge. The SFC logic 102 can also generate a combined set of network rules based on the first set of one or more network rules 704 and the second set of one or more user-defined network rules 706. The combined set of rules can be added as hardware-accelerated rules 708 on the single accelerated data plane 702. The acceleration hardware engine 214 can process network traffic data 212 in the single accelerated data plane 702 using the hardware-accelerated rules 708 (i.e., the combined set of network rules).

In at least one embodiment, the virtual bridges 104, including the first and second virtual bridges described above, are Open vSwitch (OVS) bridges. The DPU 204 can execute an OVS application with hardware offload mechanisms to provide the single accelerated data plane 702 in the acceleration hardware engine 214 to process the network traffic data 212 using the hardware-accelerated rules 708 (i.e., the combined set of network rules).

In at least one embodiment, the SFC logic 102 can add one or more host interfaces to the second virtual bridge to operatively couple to one or more host devices operatively coupled to the DPU, and one or more network interfaces to the first virtual bridge to operatively couple to one or more network ports of the DPU. The SFC logic 102 can add a first service interface to the first virtual bridge to operatively couple to the first network service, and a second service interface to the second virtual bridge to operatively couple to a second network service. The first network service and the second network service can be part of the SFC architecture 220 of the DPU-based SFC infrastructure 700. The first network service and the second network service can provide accelerated network capabilities in the single accelerated data plane 702 using the hardware-accelerated rules 708 (i.e., the combined set of network rules).

As described above, the DPU 204 can generate and configure the SFC architecture 220 of network functions 222 with hardware-accelerated rules in a single accelerated data plane of an SFC infrastructure. Examples of the SFC architectures are illustrated and described below with respect to FIG. 8 and FIG. 9.

Figure 8:
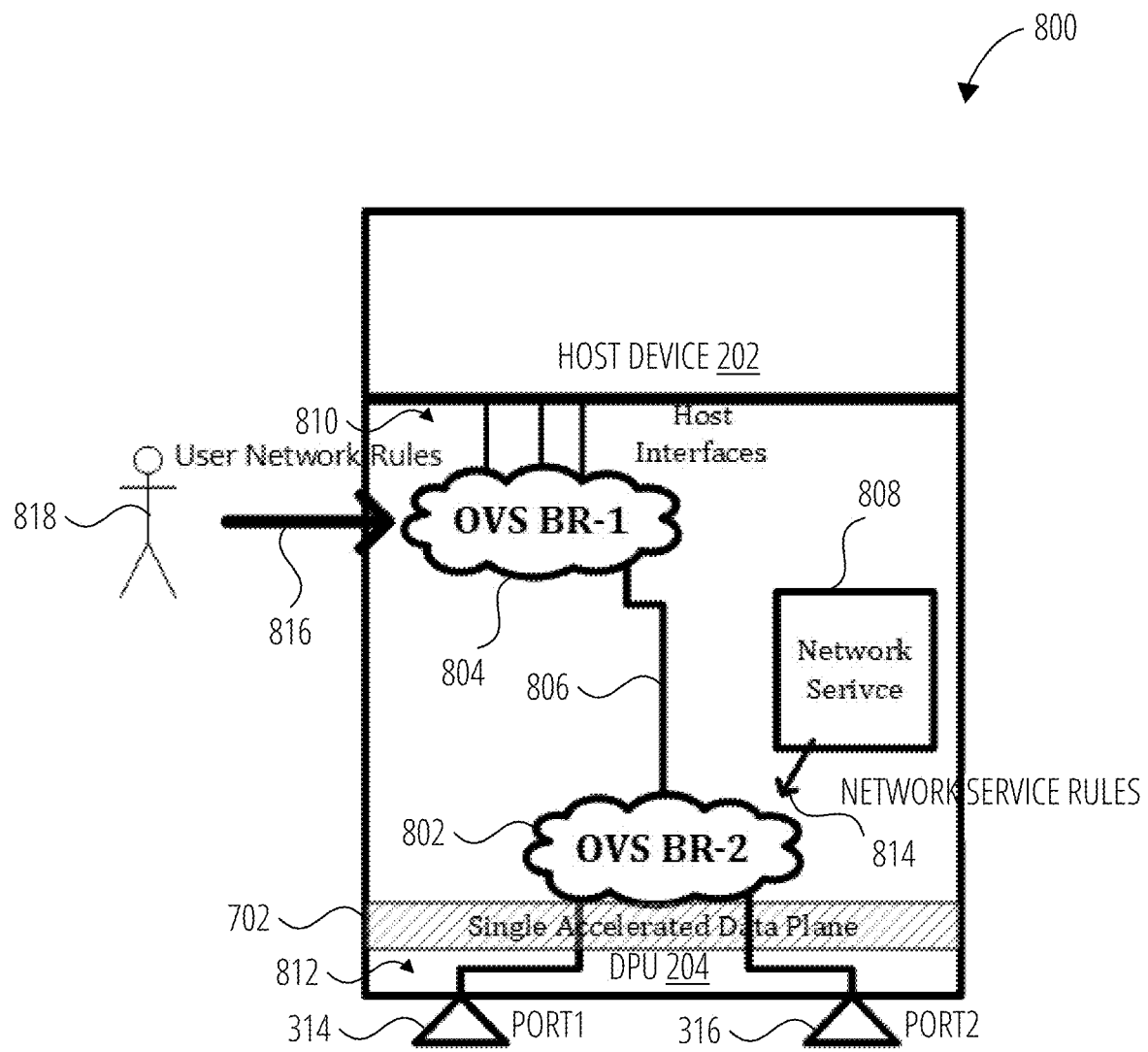
FIG. 8 is a block diagram of an SFC architecture with flexible hardware-accelerated rules for a single accelerated data plane, according to at least one embodiment.

FIG. 8 is a block diagram of an SFC architecture 800 with flexible hardware-accelerated rules for a single accelerated data plane, according to at least one embodiment. The SFC architecture 800 is similar to the SFC architecture 300 but uses different reference numbers. The SFC architecture 800 includes a first virtual bridge 802 (labeled "OVS BR-1"), a second virtual bridge 804 (labeled "OVS BR-2"), a virtual port 806, and a network service 808. As described herein, the SFC logic 102 can generate the first virtual bridge 802, the second virtual bridge 804, and the virtual port 806 in the SFC architecture 800. The SFC logic 102 can configure the first virtual bridge 802 to be controlled by network service rules 814 provided by the network service 808 hosted on the DPU 204 and the second virtual bridge 804 to be controlled by user-defined network rules 816. The SFC logic 102 adds a service interface to the first virtual bridge 802 to operatively couple the network service 808 to the first virtual bridge 802. The SFC logic 102 adds the virtual port 806 between the first virtual bridge 802 and second virtual bridge 804. The network service 808 can provide one or more network service rules 814 to the first virtual bridge 802. The user-defined logic 126 can provide one or more user-defined network rules 816 to the second virtual bridge 804. The SFC logic 102 can add one or more host interfaces 810 to the second virtual bridge 804.

As illustrated, three separate host interfaces can be added to connect the second virtual bridge 804 to hosts, such as three separate VMs hosted on the host device 202. For example, one VM can host a firewall application, another VM can host a load balancer application, and another VM can host an IDS application. The SFC logic 102 can add one or more network interfaces 812 to the first virtual bridge 802. In particular, the SFC logic 102 can add, to the first virtual bridge 802, a first network interface to operatively couple to a first network port 314 (labeled PORT1) of the DPU 204, and a second network interface to operatively couple to a second network port 316 (labeled PORT2) of the DPU 204. The first virtual bridge 802 can receive network traffic data from the first network port 314 and the second network port 316. The first virtual bridge 802 can direct the network traffic data to the second virtual bridge 804 via the virtual port 806. The second virtual bridge 804 can direct the network traffic data to the corresponding host via the host interfaces 810.

In at least one embodiment, the user-defined network rules 816 can be provided by a user 818. The user 818 can provide the user-defined network rules 816 using the user-defined logic 126. The user 818 can program the second virtual bridge 804 with the user-defined network rules 816. Alternatively, user-defined logic 126 can receive user input from the user 818, and the user-defined logic 126 can generate the user-defined network rules 816 and provide them to the second virtual bridge 804. In another embodiment, the user-defined network rules 816 can be provided by a user-defined service or another network service that is separate from the network service 808. The other network service (or user-defined service) can be a user-defined network service, a user-defined security service, a user-defined telemetry service, a user-defined storage service, or the like, hosted on the DPU 204 or as applications on the host device 202. When the user-defined network rules 816 are provided by a second network service, the SFC logic 102 can add another service interface to the second virtual bridge 804 to operatively couple the second network service to the second virtual bridge 804.

The DPU 204 can combine the network rules, corresponding to the different network services, to obtain a combined set of network rules that can be accelerated in a single accelerated data plane 702 of the DPU 204. The combined set of network rules become hardware-accelerated rules that are accelerated by the DPU 204 for the SFC architecture 800.

Figure 9:
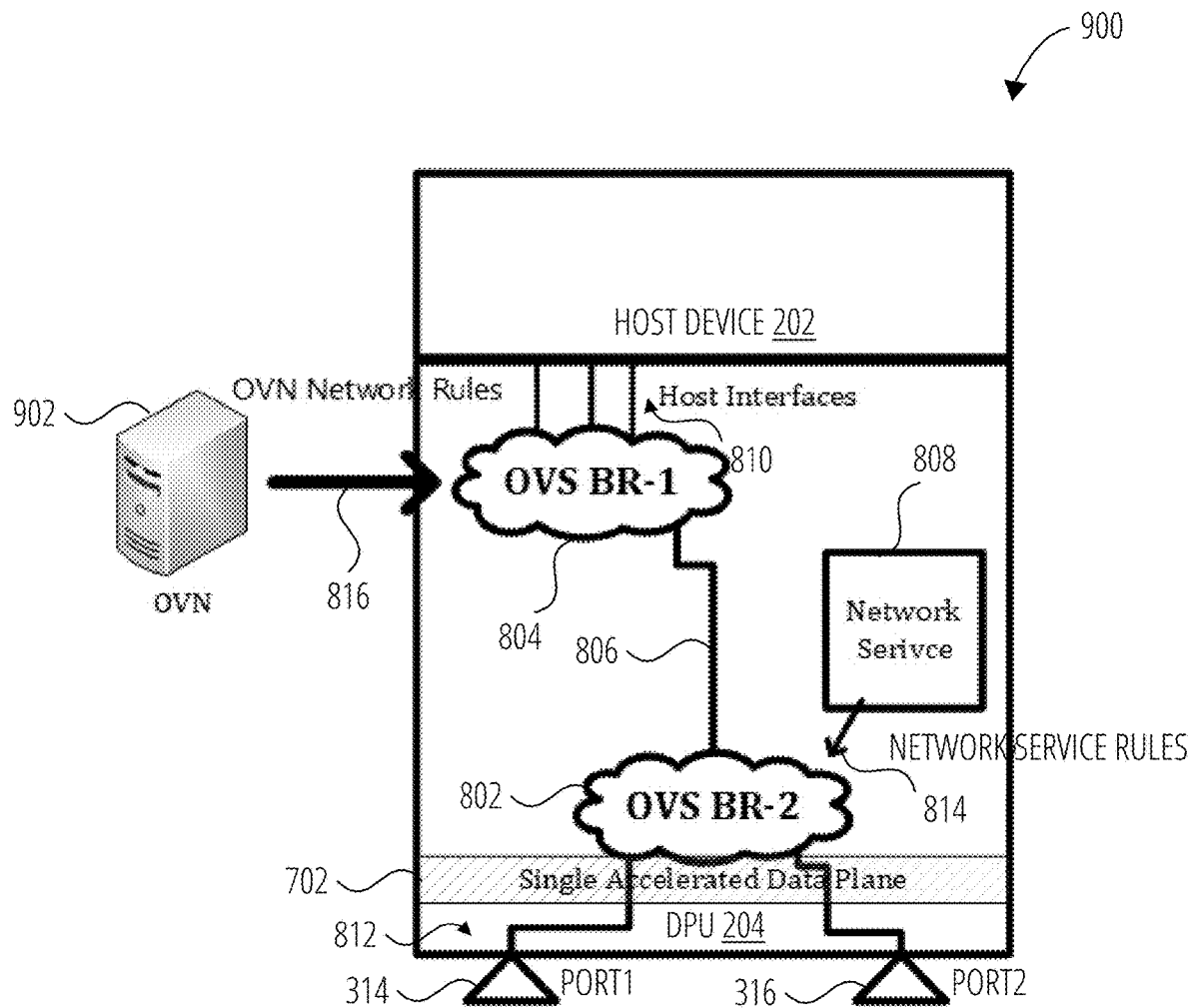
FIG. 9 is a block diagram of an SFC architecture with flexible hardware-accelerated rules for a single accelerated data plane, according to at least one embodiment.

In at least one embodiment, the DPU 204 provides a DPU service that supports Host Based Networking (HBN) as the network service 808 for acceleration of L2/L3/tunneling protocols on the DPU 204. The HBN infrastructure is based on an SFC topology, where one OVS bridge is controlled by the HBN service providing all accelerated networking capabilities. As described above, the second OVS bridge (second virtual bridge 804) can be programmable by the user 818 or any other controller (as illustrated in FIG. 9). The HBN service can support different protocols and different network capabilities, such as ACLs, ECMP, tunneling, CT and more. The user 818 can program in a flexible manner different steering rules over the SFC architecture 800 in parallel to HBN service, which will result in hardware-accelerated rules 708 for the single accelerated data plane 702 provided by OVS-DOCA and the DPU hardware. Using the SFC infrastructure, users and customers can leverage the DPU 204 as networking accelerator on an edge device without the need for sophisticated and smart switches in different network topologies in a DC network or a SP network.

It should be noted that the SFC logic 102 can generate different combinations of hardware-accelerated rules 708 in different SFC architectures, such as illustrated in FIG. 9.

FIG. 9 is a block diagram of an SFC architecture 900 with flexible hardware-accelerated rules for a single accelerated data plane, according to at least one embodiment. The SFC architecture 900 is similar to the SFC architecture 800 as noted by similar reference numbers, except the user-defined network rules 816 in SFC architecture 900 are received from a controller 902, such as an Open Virtual Network (OVN) controller. OVN is an open-source project designed to provide network virtualization solutions, enabling the creation and management of virtual network infrastructure within cloud and data center environments. It is an extension of the OVS project, leveraging its underlying technology to offer advanced network automation and scalability capabilities for virtualized networks. OVN aims to simplify the process of setting up and managing virtual networking components such as virtual switches, routers, firewalls, and load balancers. It allows for the dynamic creation of these components through software, without the need for manual configuration of the physical network hardware. This facilitates the deployment of highly flexible and scalable networks that can easily adapt to the changing needs of applications and services running in virtualized environments. OVN abstracts the physical network, allowing users to define logical networks that are mapped to the underlying physical infrastructure. This abstraction layer simplifies network design and management by enabling the use of high-level constructs such as logical switches and routers. Through integration with orchestration systems (e.g., OpenStack), OVN supports automated provisioning and configuration of network resources based on the requirements of the deployed applications and services for automated network management. OVN provides a range of networking services, including L2/L3 virtual networking, access control policies, NAT, and more, offering the functionality needed to support complex network topologies for advanced networking services. With OVN, it is possible to create isolated virtual networks, applying security policies and rules at the logical level to ensure that only authorized traffic can flow between different parts of the network. OVN is designed to scale efficiently with the size of the network and the number of virtualized workloads, aiming to minimize the impact on performance as networks grow. OVN is a tool for organizations looking to leverage the benefits of network virtualization, offering an efficient and flexible approach to managing virtual network infrastructures in modern cloud and data center environments. In another embodiment, the controller 902 can be other types of controllers, such a controller for a particular network service provided in the SFC architecture 900.

Figure 10:
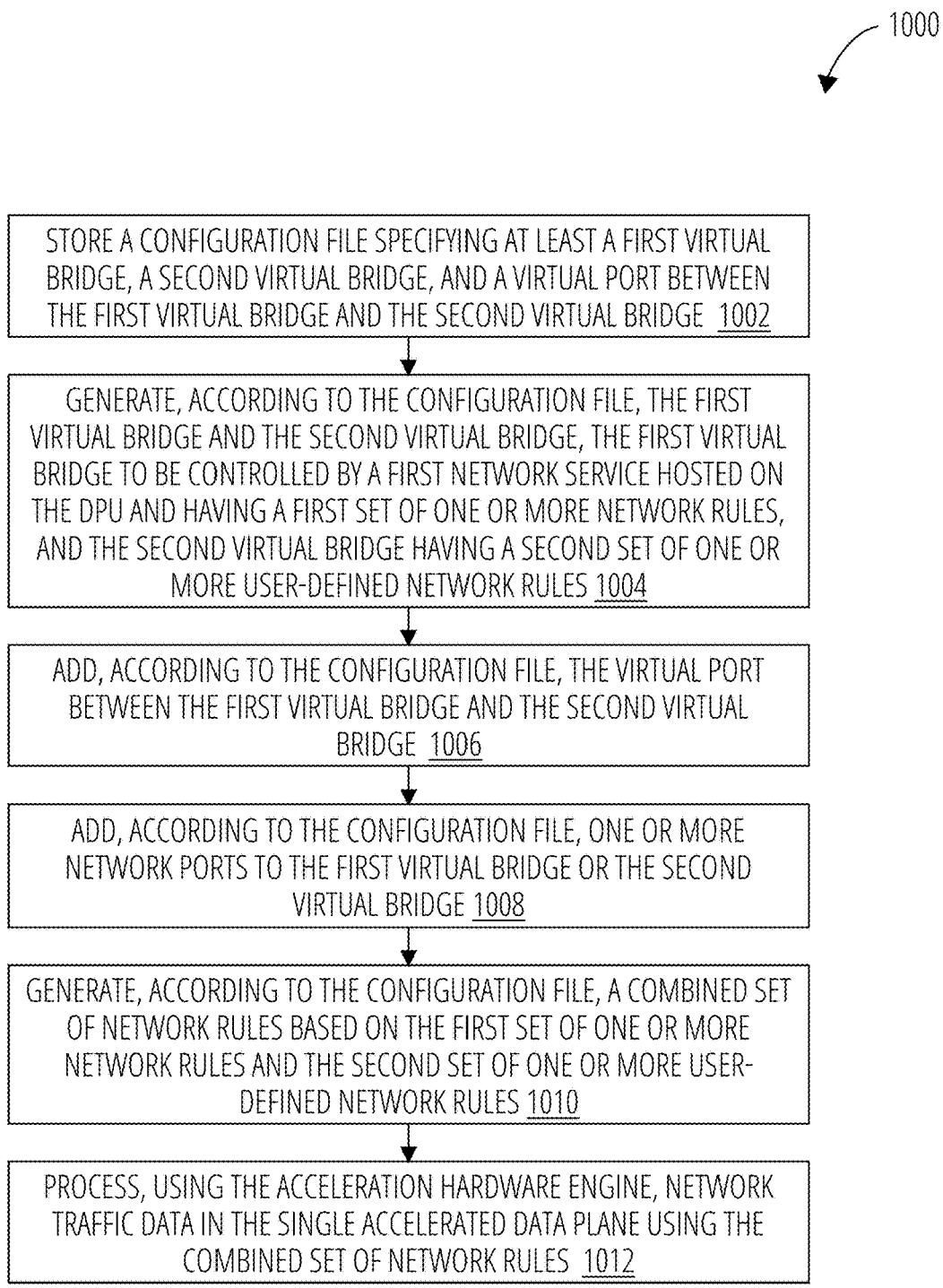
FIG. 10 is a flow diagram of an example method of configuring an SFC architecture with flexible hardware-accelerated rules for acceleration on a single accelerated data plane of a DPU according to at least one embodiment.

FIG. 10 is a flow diagram of an example method 1000 of configuring an SFC architecture with flexible hardware-accelerated rules for acceleration on a single accelerated data plane of a DPU according to at least one embodiment. The processing logic can be a combination of hardware, firmware, software, or any combination thereof. In at least one embodiment, the processing logic is implemented in a DPU, a switch, a network device, a GPU, a NIC, a CPU, or the like. In at least one embodiment, the processing logic is implemented in an acceleration hardware engine coupled to a switch. In at least one embodiment, method 1000 may be performed by multiple processing threads, each thread executing one or more individual functions, routines, subroutines, or operations of the method. In at least one embodiment, processing threads implementing method 1000 may be synchronized (e.g., using semaphores, critical sections, and/or other thread synchronization logic). Alternatively, processing threads implementing method 1000 may be executed asynchronously with respect to each other. Various operations of method 1000 may be performed differently than the order shown in FIG. 10. Some operations of the methods may be performed concurrently with other operations. In at least one embodiment, one or more operations shown in FIG. 10 may not always be performed.

Referring to FIG. 10 the processing logic begins with the processing logic storing a configuration file specifying at least a first virtual bridge, a second virtual bridge, and a virtual port between the first virtual bridge and the second virtual bridge (block 1002). At block 1004, the processing logic generates, according to the configuration file, the first virtual bridge and the second virtual bridge, the first virtual bridge to be controlled by a first network service hosted on the DPU and having a first set of one or more network rules, and the second virtual bridge having a second set of one or more user-defined network rules. At block 1006, the processing logic adds, according to the configuration file, the virtual port between the first virtual bridge and the second virtual bridge. At block 1008, the processing logic adds, according to the configuration file, one or more network ports (uplink ports) to the first virtual bridge and/or the second virtual bridge. At block 1010, the processing logic generates, according to the configuration file, a combined set of network rules based on the first set of one or more network rules and the second set of one or more user-defined network rules. At block 1012, the processing logic processes, using the acceleration hardware engine, network traffic data in the single accelerated data plane using the combined set of network rules.

In a further embodiment, the method 1000 can further include the processing logic adding, according to the configuration file, one or more network interfaces to the first virtual bridge to operatively couple to one or more network ports of the DPU, and a first service interface to the first virtual bridge to operatively couple to the first network service. The first network service can provide accelerated network capabilities using the first set of one or more network rules, where the first set of one or more network rules includes any one or more of a L2 protocol rule, a L3 protocol rule, a tunneling protocol rule, an ACL rule, an ECMP rule, a tunneling encapsulation rule, a tunneling decapsulation rule, a CT rule, a VLAN rule, a NAT rule, or the like.

In a further embodiment, the method 1000 can also include the processing logic adding, according to the configuration file, one or more host interfaces to the second virtual bridge to operatively couple to one or more host devices operatively coupled to the DPU, and receiving user input from a user or a controller, the user input specifying the second set of one or more user-defined network rules, where the second set of one or more user-defined network rules includes one or more steering rules. The processing logic can add, according to the configuration file, the second set of one or more user-defined network rules to the second virtual bridge. In at least one embodiment, the one or more steering rules includes any one or more of an application-based steering rule, a policy-based steering rule, a geolocation-based steering rule, a load balancing rule, a QoS rule, a failover rule, a redundancy rule, a security-based steering rule, a cost-based routing rule, a SD-WAN path steering rule, a software-defined networking (SDN) rule, or the like.

In a further embodiment, the method 1000 can also include the processing logic adding, according to the configuration file, one or more network interfaces to the first virtual bridge to operatively couple to one or more network ports of the DPU, and a first service interface to the first virtual bridge to operatively couple to the first network service, the first network service to provide accelerated network capabilities. The first set of one or more network rules includes at least one of an ACL rule, an ECMP rule, a tunneling rule, a CT rule, a QoS rule, a STP, a VLAN rule, a NAT rule, a SDN rule, a MPLS rule, or the like.

In a further embodiment, the method 1000 can also include the processing logic adding, according to the configuration file, one or more host interfaces to the second virtual bridge to operatively couple to one or more host devices operatively coupled to the DPU, and one or more network interfaces to the first virtual bridge to operatively couple to one or more network ports of the DPU. In a further embodiment, the method 1000 can also include the processing logic adding, according to the configuration file, a first service interface to the first virtual bridge to operatively couple to the first network service. In a further embodiment, the method 1000 can also include the processing logic adding, according to the configuration file, a second service interface to the second virtual bridge to operatively couple a second network service, where the first network service and the second network service are part of a SFC infrastructure to provide accelerated network capabilities in the single accelerated data plane using the combined set of network rules.

Creating an Optimized and Accelerated Network Pipeline Using Network Pipeline Abstraction Layer (NAPL)

A database abstraction layer (DAL) is a software component that provides a unified interface to interact with different types of database systems, enabling applications to perform database operations without needing to use database-specific syntax. The DAL acts as a mediator between the application and the database, translating the application's data access requests into the appropriate queries for the underlying database. By abstracting the specifics of the database system, the DAL allows developers to write database-independent code, thereby enhancing the application's portability and scalability. This layer can support various database operations, including creating, reading, updating, and deleting records, and can be implemented in various forms, such as object-relational mapping (ORM) libraries, which further simplify data manipulation by allowing data to be handled in terms of objects.

As described herein, an integrated circuit (e.g., DPU) can provide a network pipeline abstraction layer (NPAL) similar to a DAL. The NPAL is a software programmable layer that provides an optimized and accelerated network pipeline that supports different accelerated network capabilities, such as L2 bridging, L3 routing, tunnel encapsulation, tunnel decapsulation, hash calculations, ECMP operations, static and dynamic ACLs, CT, etc. The NPAL can include a set of APIs or classes that provide a unified interface for performing common networking operations in a network pipeline that is optimized for hardware acceleration on an acceleration hardware engine. The network pipeline can include a set of tables and logic in a specific order, the network pipeline being optimized to be accelerated by an acceleration hardware engine of a DPU hardware, providing customers and users with a rich set of capabilities and high performance.

Using an NPAL in the DPU can provide various benefits, including operational independence, encapsulation of logic, performance, code reusability, platform independence, or the like. For example, developers can write agnostic code, allowing applications (e.g., net work services) to work with different underlying access logic and network functionality. The NPAL can encapsulate the access or network function-related logic, making it easier to manage and maintain the codebase. Changes to the schema or underlying technology can be isolated within the NPAL implementation. The NPAL can provide optimized and high-performance pipeline to address different networking requirements and functionality. By separating access logic from application logic, developers can reuse the NPAL components across multiple parts of the application (network service), promoting code reuse and maintainability. The NPAL can abstract away platform-specific differences, data types, and other access or network function-related features, enabling the application (network service) to run on different platforms and environments seamlessly. Overall, the NPAL can be a powerful tool for building flexible, scalable, and maintainable network function-driven applications, offering a level of abstraction that simplifies interactions between network functions and promotes code efficiency and portability.

Figure 11:
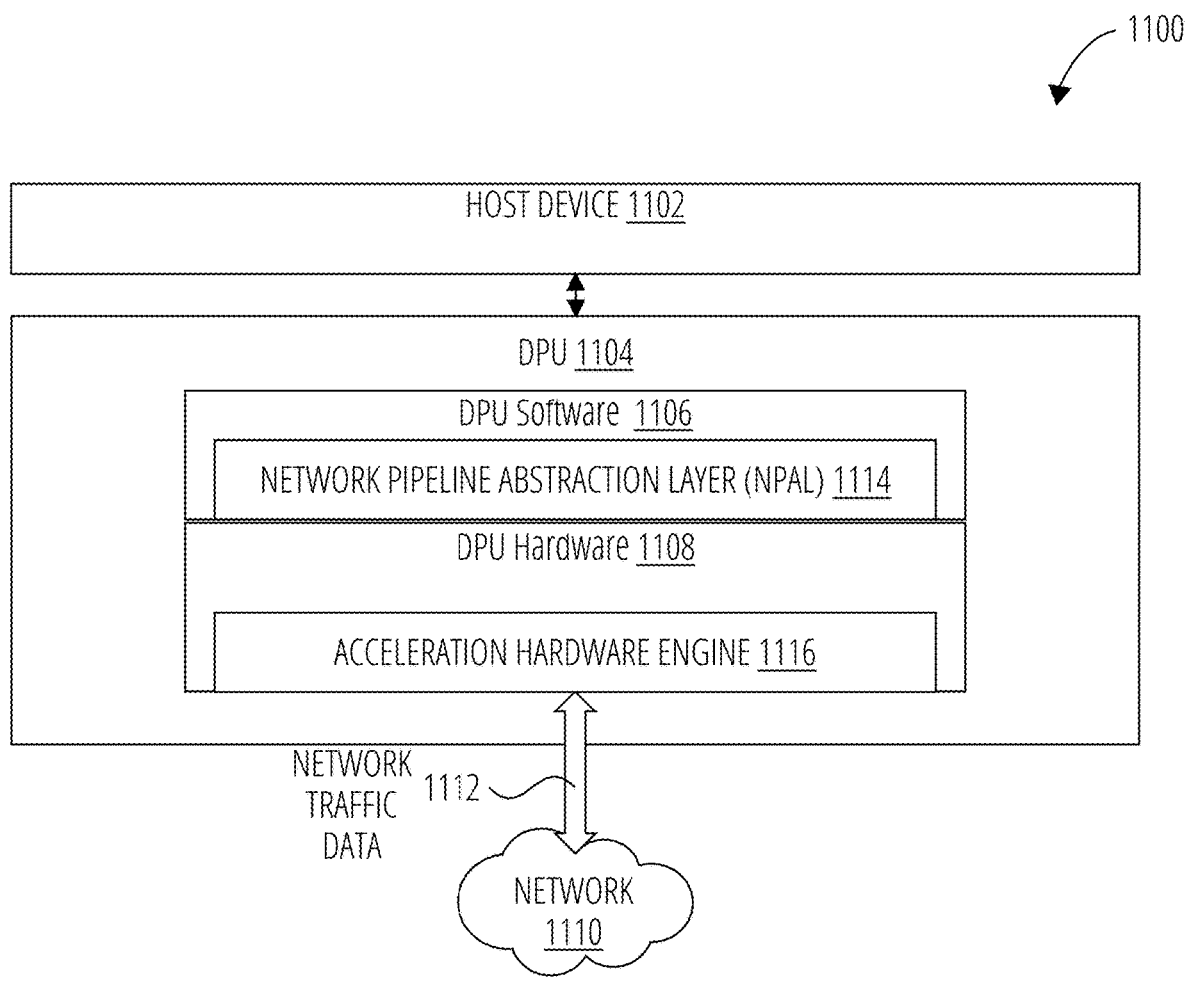
FIG. 11 is a block diagram of an example computing system with a DPU having a network pipeline abstraction layer (NPAL) for providing an optimized and accelerated network pipeline to be accelerated by an acceleration hardware engine according to at least one embodiment.

In at least one embodiment, the DPU includes DPU hardware, including a processing device and an acceleration hardware engine. The DPU includes memory operatively coupled to the DPU hardware. The memory can store DPU software including an NPAL that supports multiple network protocols and network functions in a network pipeline. The network pipeline includes a set of tables and logic organized in a specific order to be accelerated by the acceleration hardware engine. The acceleration hardware engine can process network traffic data using the network pipeline. The network pipeline can be optimized for network services running on the DPU FIG. 11 is a block diagram of an example computing system 1100 with a DPU 1104 having an NPAL 1114 for providing an optimized and accelerated network pipeline to be accelerated by an acceleration hardware engine 1116 according to at least one embodiment. The computing system 1100 includes the DPU 1104 coupled between a host device 1102 and a network 1110. The host device 1102 and DPU 1104 can be similar to the host device 202 and DPU 204 of DPU-based SFC infrastructure 200 and DPU-based SFC infrastructure 700, described above except where expressly noted.

In at least one embodiment, the DPU 1104 includes DPU hardware 1108 and DPU software 1106 (e.g., software framework with acceleration libraries). The DPU hardware 208 can include one or more CPUs (e.g., a single-core or multi-core CPU), an acceleration hardware engine 1116 (or multiple hardware accelerators), memory, and the network and host interconnects. In at least one embodiment, the DPU 1104 includes DPU software 1106, including software framework and acceleration libraries. The software framework and acceleration libraries can include one or more hardware-accelerated services, including a hardware-accelerated service (e.g., NVIDIA DOCA), hardware-accelerated virtualization services, hardware-accelerated networking services, hardware-accelerated storage services, hardware-accelerated AI/ML services, hardware-accelerated security service, and hardware-accelerated management services. The DPU software 1106 also includes NPAL 1114. The NPAL 1114 can include a set of APIs or classes that provide a unified interface for performing common networking operations in a network pipeline that is optimized for hardware acceleration on an acceleration hardware engine 1116. The set of APIs or class can provide a unified interface to one or more applications, network services, or other logic executed by the DPU 1104 or host device 1102, or both. The network pipeline can include a set of tables and logic in a specific order; the network pipeline being optimized to be accelerated by an acceleration hardware engine 1116 of the DPU hardware 1108.

During operation, the DPU hardware 1108 can receive the network traffic data 1112 from the network 1110 and process the network traffic data 1112 using the optimized and accelerated network pipeline programmed by the NPAL 1114. As described herein, the NPAL 1114 supports multiple network protocols and network functions in a network pipeline. The network pipeline includes a set of tables and logic organized in a specific order to be accelerated by the acceleration hardware engine 1116. The acceleration hardware engine 1116 can process network traffic data 1112 using the network pipeline. In at least one embodiment, the network pipeline includes an input port, an ingress dynamic or static Access Control List (ACL), a bridge, a router, an egress dynamic or static ACL, and an output port. Examples of the optimized and accelerated network pipelines are illustrated and described below with respect to FIG. 12, FIG. 13, and FIG. 14.

Figure 12:
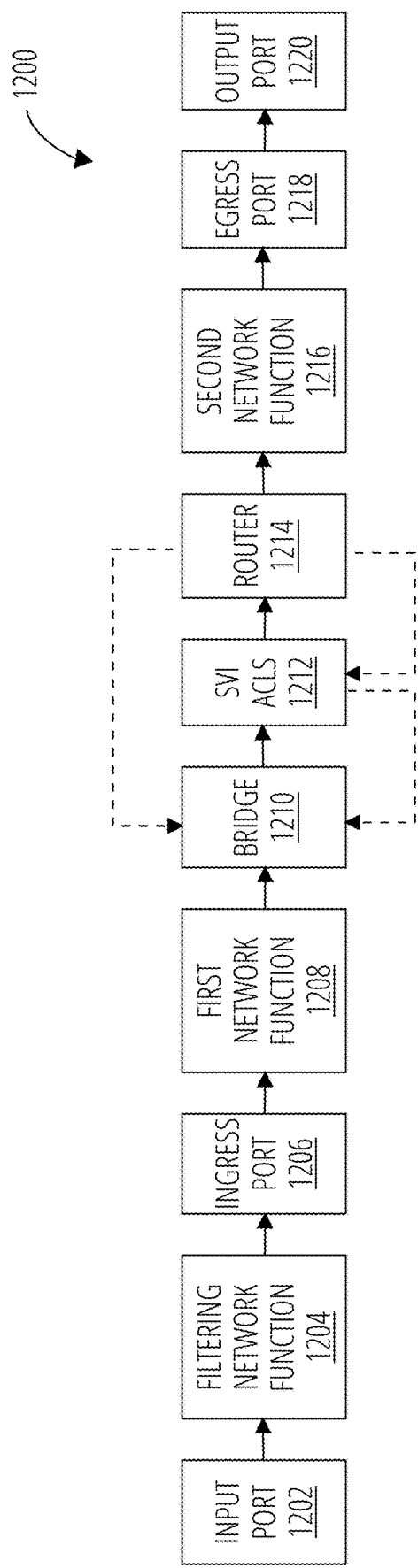
FIG. 12 is a network diagram of an example network pipeline that is optimized and accelerated on an acceleration hardware engine of a DPU having an NPAL according to at least one embodiment.

FIG. 12 is a network diagram of an example network pipeline 1200 that is optimized and accelerated on an acceleration hardware engine of a DPU having an NPAL according to at least one embodiment. The network pipeline 1200 includes an input port 1202, a filtering network function 1204, an ingress port 1206, a first network function 1208, a bridge 1210, SVI ACLs 1212, a router 1214, a second network function 1216, an egress port 1218, and an output port 1220. The input port 1202 can receive the network traffic data and provide the network traffic data to the filtering network function 1204, which is operatively coupled to the input port 1202. The filtering network function 1204 can filter the network traffic data. The ingress port 1206 is operatively coupled to the filtering network function 1204, and the ingress port 1206 is operatively coupled to the first network function 1208. The first network function 1208 can process the network traffic data using one or more ingress ACLs. The bridge 1210 is operatively coupled to the first network function 1208. The bridge 1210 can perform a layer 2 (L2) bridging operation. The one or more SVI ACLs are operatively coupled to the bridge 1210 and the router 1214. The router 1214 can perform a layer 3 (L3) routing operation. The second network function 1216 is operatively coupled to the router 1214. The second network function 1216 can process the network traffic data using one or more egress ACLs. The egress port 1218 is operatively coupled to the second network function 1216. The egress port 1218 is operatively coupled to the output port 1220. The output port 1220 can output the network traffic data.

Figure 13:
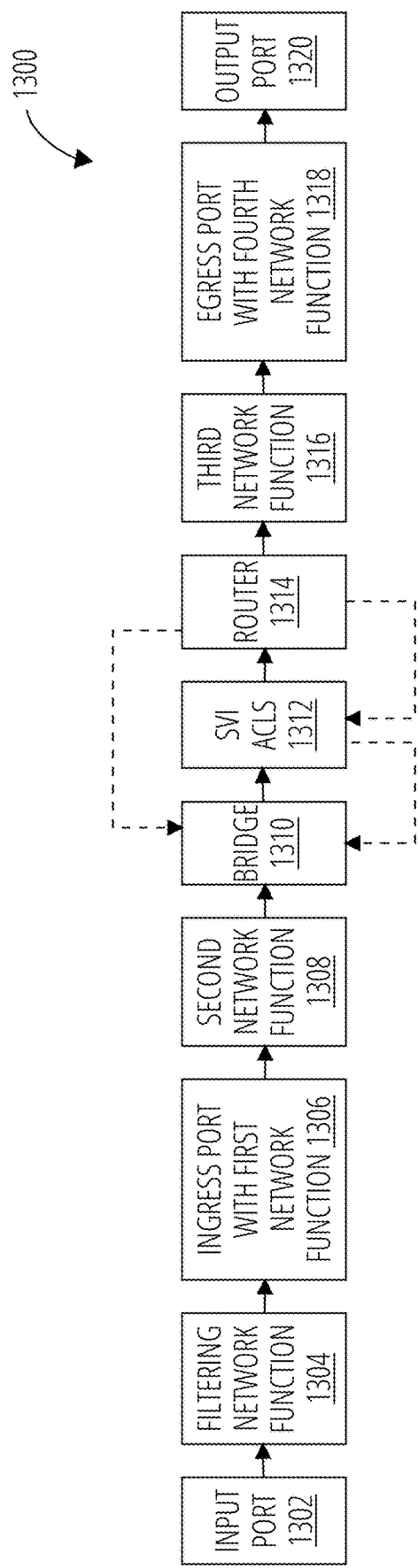
FIG. 13 is a network diagram of an example network pipeline that is optimized and accelerated on an acceleration hardware engine of a DPU having an NPAL according to at least one embodiment.

FIG. 13 is a network diagram of an example network pipeline that is optimized and accelerated on an acceleration hardware engine of a DPU having an NPAL according to at least one embodiment. The network pipeline 1300 includes an input port 1302, a filtering network function 1304, an ingress port with first network function 1306, a second network function 1308, a bridge 1310, SVI ACLs 1312, a router 1314, a third network function 1316, an egress port with fourth network function 1318, and an output port 1320. The input port 1302 can receive the network traffic data and provide the network traffic data to the filtering network function 1304, which is operatively coupled to the input port 1302. The filtering network function 1304 can filter the network traffic data, providing the network traffic data to the ingress port with the first network function 1306. The first network function 1306 can perform first virtual local area network (VLAN) mapping on the network traffic data and provide the data to the second network function 1308 (or alternatively, the bridge 1310). The second network function can process the network traffic data using one or more ingress Access Control Lists (ACLs). The ingress ACLs can be dynamic or static ACLs. The bridge 1310 is operatively coupled to the first network function and the second network function 1308. The bridge 1310 can perform a layer 2 (L2) bridging operation. The SVI ACLs are operatively coupled to the bridge 1310 and the router 1314. The router 1314 can perform a layer 3 (L3) routing operation. The third network function 1316 is operatively coupled to the router 1314. The third network function 1316 can process the network traffic data using one or more egress ACLs. The egress ACLs can be dynamic or static. The egress port with fourth network function 1318 is operatively coupled to the third network function 1316. The fourth network function can perform second VLAN mapping on the network traffic data. The output port 1320 is operatively coupled to the egress port with fourth network function 1318. The output port 1320 can output the network traffic data.

Figure 14:
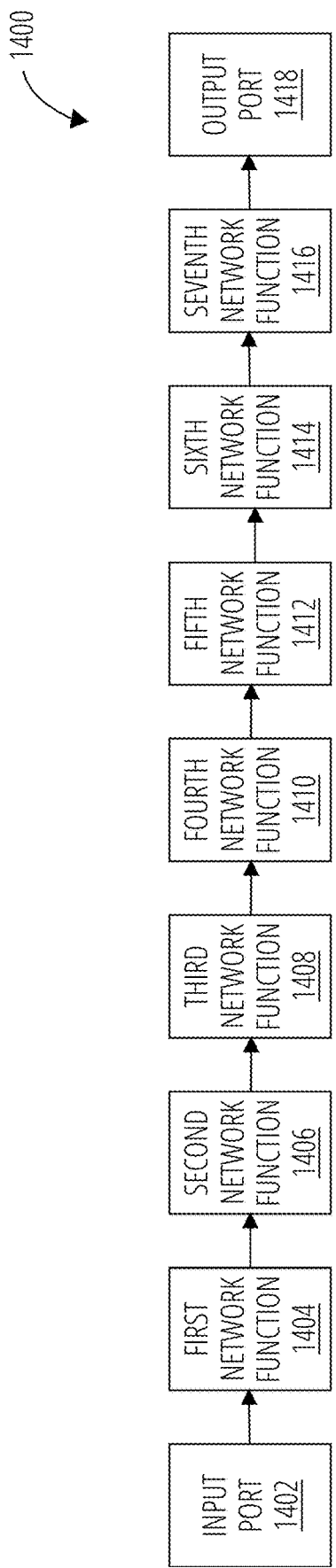
FIG. 14 is a network diagram of an example network pipeline that is optimized and accelerated on an acceleration hardware engine of a DPU having an NPAL according to at least one embodiment.

FIG. 14 is a network diagram of an example network pipeline 1400 that is optimized and accelerated on an acceleration hardware engine of a DPU having an NPAL according to at least one embodiment. The network pipeline 1400 includes an input port 1402, a first network function 1404, a second network function 1406, a third network function 1408, a fourth network function 1410, a fifth network function 1412, a sixth network function 1414, a seventh network function 1416, and an output port 1418. The network pipeline 1400 can include any combination of network functions in a specified order, each network function including logic and/or tables to implement the respective network function and pass the network traffic data to the subsequent network function. In at least one embodiment, the first network function 1404 can perform layer 2 (L2) bridging, the second network function 1406 can perform layer 3 (L3) routing, the third network function 1408 can perform tunnel encapsulation or tunnel decapsulation, the fourth network function 1410 can perform a hash calculation, the fifth network function 1412 can perform an ECMP operation, the sixth network function 1414 can perform a CT operation, and the seventh network function 1416 can perform a NAT operation. Alternatively, the network pipeline 1400 can include different numbers and different types of network operations between the input port 1402 and output port 1418.

Figure 15:
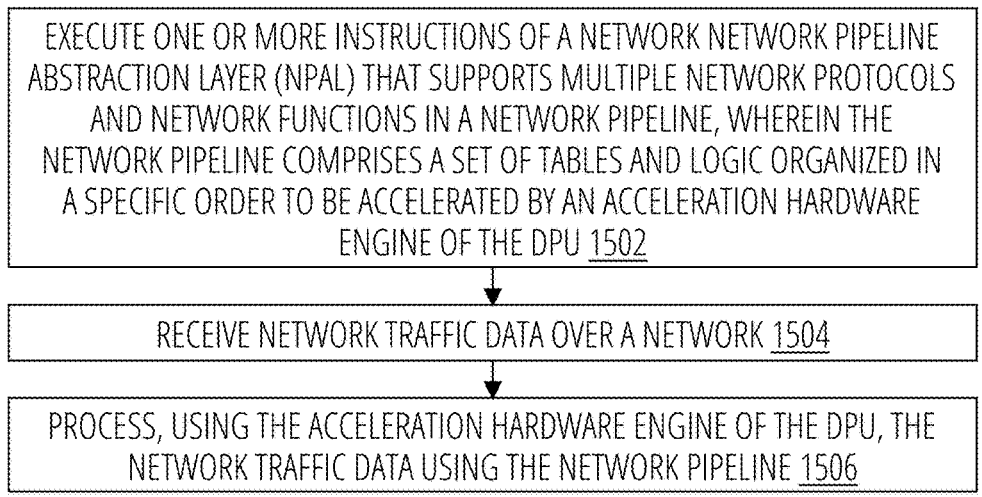
FIG. 15 is a flow diagram of an example method of creating an optimized and accelerated network pipeline using a network pipeline abstraction layer (NPAL) according to at least one embodiment.

FIG. 15 is a flow diagram of an example method 1500 of creating an optimized and accelerated network pipeline using a network pipeline abstraction layer (NPAL) according to at least one embodiment. The processing logic can be a combination of hardware, firmware, software, or any combination thereof. In at least one embodiment, the processing logic is implemented in a DPU, a switch, a network device, a GPU, a NIC, a CPU, or the like. In at least one embodiment, the processing logic is implemented in an acceleration hardware engine coupled to a switch. In at least one embodiment, method 1500 may be performed by multiple processing threads, each thread executing one or more individual functions, routines, subroutines, or operations of the method. In at least one embodiment, processing threads implementing method 1500 may be synchronized (e.g., using semaphores, critical sections, and/or other thread synchronization logic). Alternatively, processing threads implementing method 1500 may be executed asynchronously with respect to each other. Various operations of method 1500 may be performed differently than the order shown in FIG. 15. Some operations of the methods may be performed concurrently with other operations. In at least one embodiment, one or more operations shown in FIG. 15 may not always be performed.

Referring to FIG. 15, the processing logic begins with the processing logic executing one or more instructions of a network pipeline abstraction layer (NPAL) that supports multiple network protocols and network functions in a network pipeline (block 1502). The network pipeline comprises a set of tables and logic organized in a specific order to be accelerated by an acceleration hardware engine of the DPU. At block 1504, the processing logic receives network traffic data over a network. At block 1506, the processing logic processes, using the acceleration hardware engine of the DPU, the network traffic data using the network pipeline.

In at least one embodiment, the network pipeline includes the ports and network functions described above with respect to FIG. 12, FIG. 13, and FIG. 14.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range unless otherwise indicated herein, and each separate value is incorporated into the specification as if it were individually recited herein. Use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B, or C," unless specifically stated otherwise or otherwise clearly contradicted by context, is otherwise understood with the context as used in general to present that an item, term, etc., may be either A or B or C, or any nonempty subset of a set of A and B and C. For instance, in the illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. A set of non-transitory computer-readable storage media, in at least one embodiment, comprises multiple non-transitory computer-readable storage media, and one or more individual non-transitory storage media of multiple non-transitory computer-readable storage media lack all of the code while multiple non-transitory computer-readable storage media collectively store all of the code. In at least one embodiment, executable instructions are executed such that different instructions are executed by different processors—for example, a non-transitory computer-readable storage medium stores instructions, and a main CPU executes some of the instructions while a GPU executes other instructions. In at least one embodiment, different components of a computer system have separate processors, and different processors execute different subsets of instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of the present disclosure is a single device and, in another embodiment, is a distributed computer system comprising multiple devices that operate differently such that the distributed computer system performs operations described herein and such that a single device does not perform all operations.

Use of any and all examples, or exemplary language (e.g., "such as") provided herein, is intended merely to better illuminate embodiments of the disclosure, and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

The terms "coupled" and "connected," along with their derivatives, may be used in the description and claims. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other but yet still co-operate or interact with each other.

Unless specifically stated otherwise, it may be appreciated that throughout the specification terms such as "processing," "computing," "calculating," "determining," or like, refer to action and/or processes of a computer or computing system or similar electronic computing devices, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, a "processor" may be a CPU or a GPU. A "computing platform" may comprise one or more processors. Software processes, as used herein, may include, for example, software and/or hardware entities that perform work over time, such as tasks, threads, and intelligent agents. Also, each process may refer to multiple processes for carrying out instructions in sequence or parallel, continuously, or intermittently. The terms "system" and "method" are used interchangeably herein, as a system can embody one or more methods, and methods can be considered a system.

In the present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from a providing entity to an acquiring entity. References may also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or via an inter-process communication mechanism.

Although the discussion above sets forth example implementations of the described techniques, other architectures may be used to implement the described functionality and are intended to be within the scope of this disclosure. Furthermore, although specific distributions of responsibilities are defined above for purposes of discussion, various functions and responsibilities can be distributed and divided in different ways, depending on circumstances.

Furthermore, although the subject matter has been described in language specific to structural features and/or methods, it is to be understood that the subject matter claimed in appended claims is not necessarily limited to specific features or acts as described. Rather, specific features and acts are disclosed as exemplary forms of implementing the claims.

What is claimed is:

1. A data processing unit (DPU) comprising:
an acceleration hardware engine to provide a single accelerated data plane;
memory to store a configuration file specifying at least a first virtual bridge, a second virtual bridge, and a virtual port between the first virtual bridge and the second virtual bridge; and
a processing device operatively coupled to the memory and the acceleration hardware engine, wherein the processing device, according to the configuration file, is to:
generate the first virtual bridge and the second virtual bridge, the first virtual bridge to be controlled by a first network service hosted on the DPU and having a first set of one or more network rules, and the second virtual bridge having a second set of one or more user-defined network rules;
add the virtual port between the first virtual bridge and the second virtual bridge; and
generate a combined set of network rules based on the first set of one or more network rules and the second set of one or more user-defined network rules; and wherein the acceleration hardware engine is to process network traffic data in the single accelerated data plane using the combined set of network rules.

2. The DPU of claim 1, wherein the processing device, according to the configuration file, is to:
add one or more network interfaces to the first virtual bridge to operatively couple to one or more network ports of the DPU; and
add a first service interface to the first virtual bridge to operatively couple to the first network service, the first network service to provide accelerated network capabilities using the first set of one or more network rules, wherein the first set of one or more network rules comprises at least one of a layer 2 (L2) protocol rule, a layer 3 (L3) protocol rule, a tunneling protocol rule, an Access Control List (ACL) rule, an Equal-Cost Multi-Path (ECMP) rule, a tunneling encapsulation rule, a tunneling decapsulation rule, a Connection Tracking (CT) rule, a virtual local area network (VLAN) rule, or a network address translation (NAT) rule.

3. The DPU of claim 1, wherein the processing device is to:
add, according to the configuration file, one or more host interfaces to the second virtual bridge to operatively couple to one or more host devices operatively coupled to the DPU; and
receive user input from a user or a controller, the user input specifying the second set of one or more user-defined network rules, wherein the second set of one or more user-defined network rules comprises one or more steering rules; and
add, according to the configuration file, the second set of one or more user-defined network rules to the second virtual bridge.

4. The DPU of claim 3, wherein the one or more steering rules comprises at least one of an application-based steering rule, a policy-based steering rule, a geolocation-based steering rule, a load balancing rule, a Quality of Service (QOS) rule, a failover rule, a redundancy rule, a security-based steering rule, a cost-based routing rule, a software-defined wide area network (SD-WAN) path steering rule, or a software-defined networking (SDN) rule.

5. The DPU of claim 1, wherein the processing device, according to the configuration file, is to:
add one or more network interfaces to the first virtual bridge to operatively couple to one or more network ports of the DPU; and
add a first service interface to the first virtual bridge to operatively couple to the first network service, the first network service to provide accelerated network capabilities, wherein the first set of one or more network rules comprises at least one of an Access Control List (ACL) rule, an Equal-Cost Multi-Path (ECMP) rule, a tunneling rule, a Connection Tracking (CT) rule, a Quality of Service (QOS) rule, a Spanning Tree Protocol (STP), a virtual local area network (VLAN) rule, a network address translation (NAT) rule, a software-defined networking (SDN) rule, or a multi-protocol label switching (MPLS) rule.

6. The DPU of claim 1, wherein the second set of one or more user-defined network rules are programmable by a user or a controller.

7. The DPU of claim 1, wherein the first virtual bridge and the second virtual bridge are Open vSwitch (OVS) bridges, wherein the processing device is to execute an OVS application with hardware offload mechanisms to provide the single accelerated data plane in the acceleration hardware engine to process the network traffic data using the combined set of network rules.

8. The DPU of claim 1, wherein the processing device, according to the configuration file, is to:
add one or more host interfaces to the second virtual bridge to operatively couple to one or more host devices operatively coupled to the DPU; and
add one or more network interfaces to the first virtual bridge to operatively couple to one or more network ports of the DPU; and
add a first service interface to the first virtual bridge to operatively couple to the first network service; and
add a second service interface to the second virtual bridge to operatively couple to a second network service, wherein the first network service and the second network service are part of a service function chaining (SFC) infrastructure to provide accelerated network capabilities in the single accelerated data plane using the combined set of network rules.

9. A method of operating a data processing unit (DPU) with an acceleration hardware engine to provide a single accelerated data plane, the method comprising:
storing a configuration file specifying at least a first virtual bridge, a second virtual bridge, and a virtual port between the first virtual bridge and the second virtual bridge;
generating, according to the configuration file, the first virtual bridge and the second virtual bridge, the first virtual bridge to be controlled by a first network service hosted on the DPU and having a first set of one or more network rules, and the second virtual bridge having a second set of one or more user-defined network rules;
adding, according to the configuration file, the virtual port between the first virtual bridge and the second virtual bridge;
generating, according to the configuration file, a combined set of network rules based on the first set of one or more network rules and the second set of one or more user-defined network rules; and
processing, using the acceleration hardware engine, network traffic data in the single accelerated data plane using the combined set of network rules.

10. The method of claim 9, further comprising:
adding, according to the configuration file, one or more network interfaces to the first virtual bridge to operatively couple to one or more network ports of the DPU; and
adding, according to the configuration file, a first service interface to the first virtual bridge to operatively couple to the first network service, the first network service to provide accelerated network capabilities using the first set of one or more network rules, wherein the first set of one or more network rules comprises at least one of a layer 2 (L2) protocol rule, a layer 3 (L3) protocol rule, a tunneling protocol rule, an Access Control List (ACL) rule, an Equal-Cost Multi-Path (ECMP) rule, a tunneling encapsulation rule, a tunneling decapsulation rule, a Connection Tracking (CT) rule, a virtual local area network (VLAN) rule, or a network address translation (NAT) rule.

11. The method of claim 9, further comprising:
adding, according to the configuration file, one or more host interfaces to the second virtual bridge to operatively couple to one or more host devices operatively coupled to the DPU; and
receiving user input from a user or a controller, the user input specifying the second set of one or more user-defined network rules, wherein the second set of one or more user-defined network rules comprises one or more steering rules; and
adding, according to the configuration file, the second set of one or more user-defined network rules to the second virtual bridge.

12. The method of claim 11, wherein the one or more steering rules comprises at least one of an application-based steering rule, a policy-based steering rule, a geolocation-based steering rule, a load balancing rule, a Quality of Service (QOS) rule, a failover rule, a redundancy rule, a security-based steering rule, a cost-based routing rule, a software-defined wide area network (SD-WAN) path steering rule, or a software-defined networking (SDN) rule.

13. The method of claim 9, further comprising:
adding, according to the configuration file, one or more network interfaces to the first virtual bridge to operatively couple to one or more network ports of the DPU; and
adding, according to the configuration file, a first service interface to the first virtual bridge to operatively couple to the first network service, the first network service to provide accelerated network capabilities, wherein the first set of one or more network rules comprises at least one of an Access Control List (ACL) rule, an Equal-Cost Multi-Path (ECMP) rule, a tunneling rule, a Connection Tracking (CT) rule, a Quality of Service (QOS) rule, a Spanning Tree Protocol (STP), a virtual local area network (VLAN) rule, a network address translation (NAT) rule, a software-defined networking (SDN) rule, or a multi-protocol label switching (MPLS) rule.

14. The method of claim 9, further comprising:
adding, according to the configuration file, one or more host interfaces to the second virtual bridge to operatively couple to one or more host devices operatively coupled to the DPU; and
adding, according to the configuration file, one or more network interfaces to the first virtual bridge to operatively couple to one or more network ports of the DPU; and
adding, according to the configuration file, a first service interface to the first virtual bridge to operatively couple to the first network service; and
adding, according to the configuration file, a second service interface to the second virtual bridge to operatively couple a second network service, wherein the first network service and the second network service are part of a service function chaining (SFC) infrastructure to provide accelerated network capabilities in the single accelerated data plane using the combined set of network rules.

15. A computing system comprising:
a host device; and
an integrated circuit coupled to the host device and a network, wherein the integrated circuit comprises:
a network interconnect coupled to the network;
a host interconnect coupled to the host device;
a memory to store a configuration file specifying at least a first virtual bridge, a second virtual bridge, and a virtual port between the first virtual bridge and the second virtual bridge;
an acceleration hardware engine to provide a single accelerated data plane; and a central processing unit (CPU) coupled to the network interconnect, the host interconnect, and the acceleration hardware engine, wherein the CPU is to:
  generate the first virtual bridge and the second virtual bridge, the first virtual bridge to be controlled by a first network service hosted on the integrated circuit and having a first set of one or more network rules, and the second virtual bridge having a second set of one or more user-defined network rules;
  add the virtual port between the first virtual bridge and the second virtual bridge; and
  generate a combined set of network rules based on the first set of one or more network rules and the second set of one or more user-defined network rules; and
wherein the acceleration hardware engine is to process network traffic data in the single accelerated data plane using the combined set of network rules.

16. The computing system of claim 15, wherein the integrated circuit is at least one of a data processing unit (DPU), a network interface card (NIC), a network interface device, or a switch, wherein the DPU is a programmable data center infrastructure on a chip.

17. The computing system of claim 15, wherein the CPU, according to the configuration file, is to:
  add one or more network interfaces to the first virtual bridge to operatively couple to one or more network ports of the integrated circuit; and
  add a first service interface to the first virtual bridge to operatively couple to the first network service, the first network service to provide accelerated network capabilities using the first set of one or more network rules, wherein the first set of one or more network rules comprises at least one of a layer 2 (L2) protocol rule, a layer 3 (L3) protocol rule, a tunneling protocol rule, an Access Control List (ACL) rule, an Equal-Cost Multi-Path (ECMP) rule, a tunneling encapsulation rule, a tunneling decapsulation rule, a Connection Tracking (CT) rule, a virtual local area network (VLAN) rule, or a network address translation (NAT) rule.

18. The computing system of claim 15, wherein the CPU is to:
  add, according to the configuration file, one or more host interfaces to the second virtual bridge to operatively couple to one or more host devices operatively coupled to the integrated circuit; and
  receive user input from a user or a controller, the user input specifying the second set of one or more user-defined network rules, wherein the second set of one or more user-defined network rules comprises one or more steering rules; and
  add, according to the configuration file, the second set of one or more user-defined network rules to the second virtual bridge.

19. The computing system of claim 18, wherein the one or more steering rules comprises at least one of an application-based steering rule, a policy-based steering rule, a geolocation-based steering rule, a load balancing rule, a Quality of Service (QOS) rule, a failover rule, a redundancy rule, a security-based steering rule, a cost-based routing rule, a software-defined wide area network (SD-WAN) path steering rule, or a software-defined networking (SDN) rule.

20. The computing system of claim 15, wherein the CPU, according to the configuration file, is to:
  add one or more network interfaces to the first virtual bridge to operatively couple to one or more network ports of the integrated circuit; and
  add a first service interface to the first virtual bridge to operatively couple to the first network service, the first network service to provide accelerated network capabilities, wherein the first set of one or more network rules comprises at least one of an Access Control List (ACL) rule, an Equal-Cost Multi-Path (ECMP) rule, a tunneling rule, a Connection Tracking (CT) rule, a Quality of Service (QOS) rule, a Spanning Tree Protocol (STP), a virtual local area network (VLAN) rule, a network address translation (NAT) rule, a software-defined networking (SDN) rule, or a multi-protocol label switching (MPLS) rule.

* * * * *